(12) United States Patent
Lu et al.

(10) Patent No.: US 10,686,377 B1
(45) Date of Patent: Jun. 16, 2020

(54) START-UP METHOD AND APPARATUS FOR BOOST CONVERTERS

(71) Applicant: Dialog Semiconductor (UK) Limited, London (GB)

(72) Inventors: Edward Lu, Taipei (TW); Stella Su, Hualien County (TW); Yuan Wen Hsiao, Hsinchu (TW); Der-Ju Hung, New Taipei (TW)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/561,309

(22) Filed: Sep. 5, 2019

(51) Int. Cl.
| | |
|---|---|
| *H02M 3/158* | (2006.01) |
| *H02M 1/08* | (2006.01) |
| *H02M 1/36* | (2007.01) |
| *H02M 1/00* | (2006.01) |

(52) U.S. Cl.
CPC ............. *H02M 3/158* (2013.01); *H02M 1/08* (2013.01); *H02M 1/36* (2013.01); *H02M 2001/0045* (2013.01)

(58) Field of Classification Search
CPC .......... H02M 1/08; H02M 1/088; H02M 1/36; H02M 3/156; H02M 3/158; H02M 3/1582; H02M 2001/0045
See application file for complete search history.

(56) References Cited

U.S. PATENT DOCUMENTS

| | | | |
|---|---|---|---|
| 8,508,196 B2 * | 8/2013 | Deguchi ............... | H02M 3/156 323/242 |
| 9,608,522 B2 * | 3/2017 | Lin ......................... | H02M 1/36 |
| 2013/0223120 A1 * | 8/2013 | Dragojevic ............ | H02M 7/06 363/126 |
| 2017/0019051 A1 * | 1/2017 | Fujie ........................ | H02J 1/00 |
| 2020/0014304 A1 * | 1/2020 | Chang ............... | H02M 3/33523 |

OTHER PUBLICATIONS

"DC-to-DC Design Guide," by Serge Jaunay et al., Vishay, AN607, Vishay Siliconix, Document No. 71917, Oct. 10, 2002, pp. 1-23.
"Minimizing Ringing at the Switch Node of a Boost Converter", by Jeff Falin, Texas Instruments, Application Report SLVA255—Sep. 2006, pp. 1-4.

(Continued)

*Primary Examiner* — Matthew V Nguyen
(74) *Attorney, Agent, or Firm* — Saile Ackerman LLC; Stephen B. Ackerman

(57) ABSTRACT

There is presented a boost converter and an associated method for starting the boost converter. The boost converter includes an input terminal for receiving an input voltage, an output terminal for providing an output voltage, a low-side power switch and a high-side power switch coupled at a switching node, and a voltage regulator coupled to the high-side power switch. The boost converter is also provided with a controller for operating the boost converter in a start-up phase. In the start-up phase the controller controls the boost converter to generate an intermediate voltage and increase the intermediate voltage to a predetermined value. The intermediate voltage is then provided to the voltage regulator to obtain a drive voltage. The high side power switch is then driven to increase the output voltage linearly up to a start-up voltage.

20 Claims, 18 Drawing Sheets

(56) References Cited

OTHER PUBLICATIONS

Texas Instruments Data Sheet, TPS61230A 5-V/6-A High Efficiency Step-Up Converter in 2.0-mm x 2.0-mm VQFN Package, Oct. 2018, 28 pages.
MPS Data Sheet, MP9184A, Jun. 30, 2016, 19A, 600kHz, 20V Wide Input Range, Synchronous Boost Coverter with Input Disconnect Function, pp. 1-26.
"A Novel Precise Step-Shaped Soft-Start Technique for Integrated DC-DC Converter," by Chun-Yu Hsieh et al., 2007 14th IEEE International Conference on Electronics, Circuits and Systems, Dec. 11-14, 2007, pp. 771-774.

\* cited by examiner

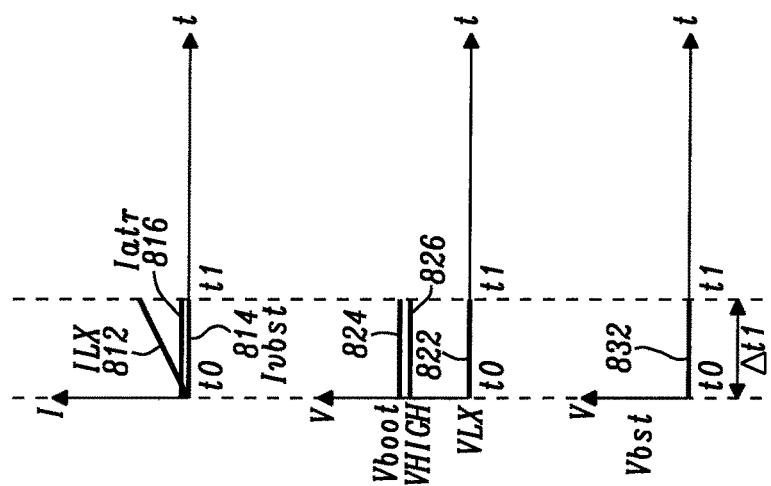
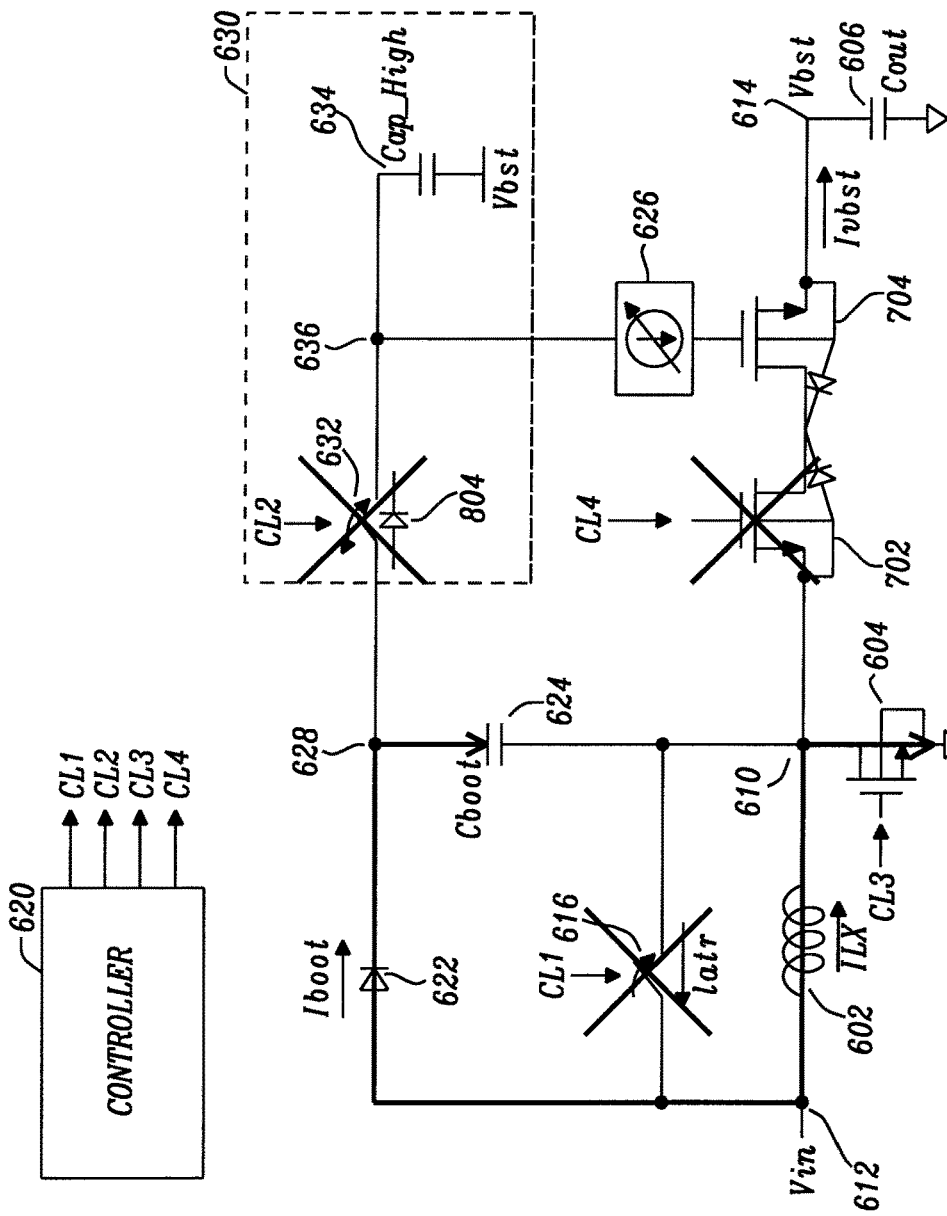
FIG. 8A
FIG. 8B

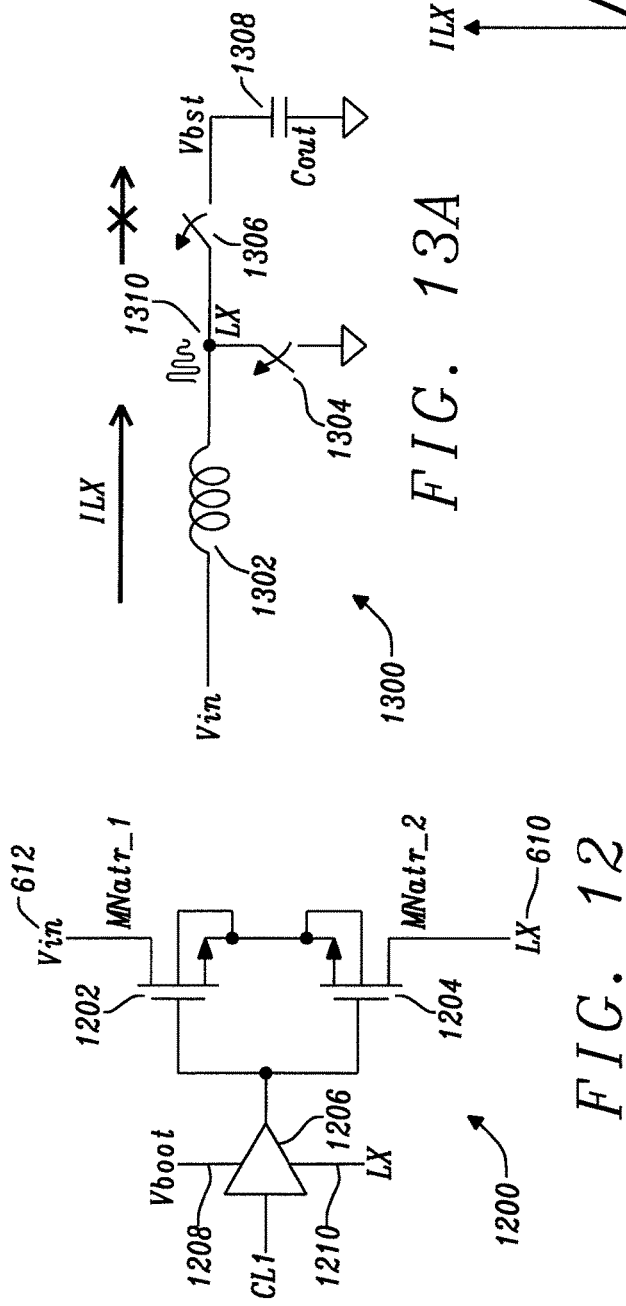
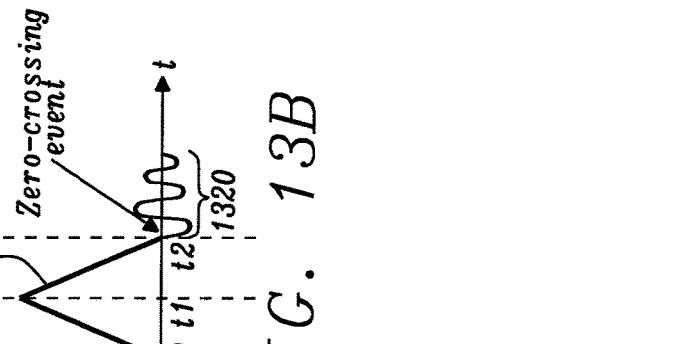
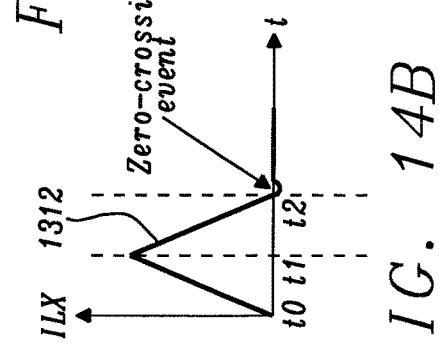
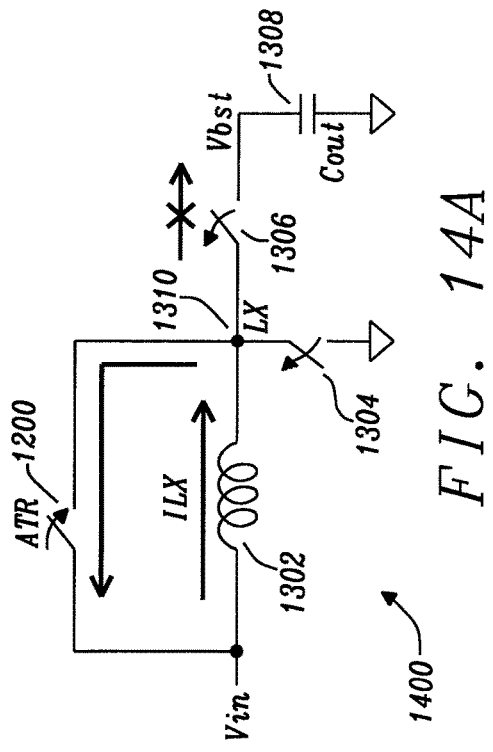
FIG. 12
FIG. 13A
FIG. 13B
FIG. 14A
FIG. 14B

START-UP METHOD AND APPARATUS FOR BOOST CONVERTERS

TECHNICAL FIELD

The present disclosure relates to methods and associated systems for the start-up of boost converters.

BACKGROUND

Boost converters require a start-up procedure that brings an input voltage up to a certain level before the operation of the boost converter can start. Conventionally, when a boost converter is started, the output voltage is lower than the input voltage by a diode voltage drop, due to the forward body diode of the high side switch. However, some applications such as displays require the output voltage to rise to the desired level starting from zero. In this case the output must be properly regulated during the start-up phase in order to avoid inrush currents that might damage the electrical circuits of the boost converter and of the devices coupled to the converter. This issue has generally been addressed by configuring the boost converter to implement a dual-mode operation such that at start-up the boost converter operates according to a "soft start-up" method and after start-up the boost converter operates according to normal "boost switching" operation.

A common approach for implementing soft start-up in boost converters consists in implementing a start-up procedure that comprises a start-up pre-charge phase followed by a start-up-boost phase. During the start-up pre-charge phase, also referred to as pre-charge phase, the output voltage increases gradually from zero to a voltage equal or close to the input voltage. During the start-up boost phase the boost circuit is turned on and the output voltage is pumped up to the target voltage via the switching operation of the converter, after which the converter enters the normal boost switching operation.

N-N type boost converters are a class of boost converters having a low side and a high side switch implemented as N-type switches, such as N-type MOSFET switches. For some applications, such as display, the N-N topology is becoming increasingly popular over the P-N topology, where the low side switch is implemented by a N-type MOSFET switch and the high side switch by a P-type MOSFET switch. This is mostly due to the area savings achievable by using N-type switches without reduction in performance.

However, implementing a pre-charge phase to achieve soft start-up in N-N boost converters is challenging. In order to gradually increase the output voltage of N-N boost converters from zero to the desired level while preventing the inductor current from increasing excessively, a specifically design pre-charge system and procedure are generally required.

Some N-N boost converters implement the pre-charge phase by using a current limiting switch and a charge pump to gradually increase the output voltage to the same level as the input voltage before entering the start-up boost phase. However, this solution entails higher design costs and complexity as well as a larger implementation area, which is incompatible with small devices or wearable applications where area savings are essential for an optimized product design and customer experience.

Other prior art start-up N-N boost converters do not make use of a charge pump, however they do not manage to raise the output voltage to the input level before entering the start-up boost phase and therefore when the boost phase starts they are affected by an initial inrush current limiting the performance of the converter.

SUMMARY

It is an object of the present disclosure to address one or more of the above-mentioned limitations.

According to a first aspect of the disclosure, there is provided a boost converter comprising a low-side power switch coupled to a high-side power switch at a switching node, an input terminal for receiving an input voltage and an output terminal for providing an output voltage; a voltage regulator coupled to the high-side power switch and a controller adapted to operate the boost converter in a start-up phase; wherein in the start-up phase the controller controls the boost converter to generate an intermediate voltage and increase the intermediate voltage to a predetermined value; to provide the intermediate voltage to the voltage regulator to obtain a drive voltage to drive the high side power switch; and to drive the high side power switch to increase the output voltage linearly up to a start-up voltage.

Optionally, the predetermined value is greater than the input voltage.

Optionally, the predetermined value is about twice the input voltage; and the start-up voltage is about the input voltage.

Optionally, the controller is adapted to operate the boost converter in a plurality of states forming a cycle, and to perform multiple cycles until the output voltage has reached the start-up voltage.

Optionally, the boost converter comprises a bypass switch coupled in parallel with the inductor, wherein the controller is adapted to close the bypass switch to prevent a switching node voltage to increase beyond a threshold value.

Optionally, the boost converter comprises a first capacitor coupled to the low side power switch via the switching node; an inductor; and a rectifier switch provided between the first capacitor and the voltage regulator wherein in a first state, the controller decouples the switching node from the output terminal, charges the first capacitor to obtain the intermediate voltage and closes the low-side power switch to magnetise the inductor.

Optionally, in a second state, the controller maintains the switching node decoupled from the output terminal and opens the low-side power switch to increase the intermediate voltage to the predetermined value.

Optionally, in a third state, the controller couples the switching node to the output terminal and closes the rectifier switch to provide the intermediate voltage to the voltage regulator.

Optionally, in a fourth state, the controller maintains the switching node coupled to the output terminal and closes the bypass switch.

Optionally, the rectifier switch is coupled to a second capacitor. For instance the rectifier switch and the second capacitor may form a voltage rectifier.

Optionally, the second capacitor is coupled to the output terminal.

Optionally, the voltage regulator comprises a low drop out regulator.

Optionally, the boost converter comprises another high-side power switch coupled to the high-side power switch.

Optionally, a drain terminal of the high-side power switch is connected to a drain terminal of the said another high-side power switch.

Optionally, the bypass switch comprises a driver coupled to a pair of switches in a cascode configuration.

Optionally, the high-side power switch and the low-side power switch are N-types power switches.

According to a second aspect of the disclosure, there is provided a start-up method for use with a boost converter comprising a low-side power switch coupled to a high-side power switch at a switching node, an input terminal for receiving an input voltage and an output terminal for providing an output voltage; a voltage regulator coupled to the high-side power switch; the method comprising generating an intermediate voltage and increasing the intermediate voltage to a predetermined value; providing the intermediate voltage to the voltage regulator to obtain a drive voltage to drive the high side power switch; and driving the high-side power switch to increase the output voltage linearly up to a start-up voltage.

For example, the boost converter may increase the output voltage from 0V to the start-up voltage.

Optionally, the predetermined value is greater than the input voltage.

Optionally, the predetermined value is about twice the input voltage; and the start-up voltage is about the input voltage.

Optionally, the method comprises rectifying the intermediate voltage.

The options described with respect to the first aspect of the disclosure are also common to the second aspects of the disclosure.

BRIEF DESCRIPTION OF THE DRAWINGS

The disclosure is described in further detail below by way of example and with reference to the accompanying drawings, in which:

FIG. 8A is a schematic illustrating the states of the switches of the circuit of FIG. 7 during a first time interval;

FIG. 8B is a time chart illustrating the currents and voltages in circuit of FIG. 7 during the first time interval;

FIG. 12 is a diagram of an anti-ringing switch;

FIG. 13A is a diagram of a basic boost converter;

FIG. 13B is a plot illustrating the workings of the boost converter of FIG. 13A;

FIG. 14A is a diagram of a boost converter provided with an anti-ringing switch;

FIG. 14B is a plot illustrating the workings of the boost converter of FIG. 14A;

FIG. 17 B is a plot of a rectified voltage;

DESCRIPTION

Figure 1:
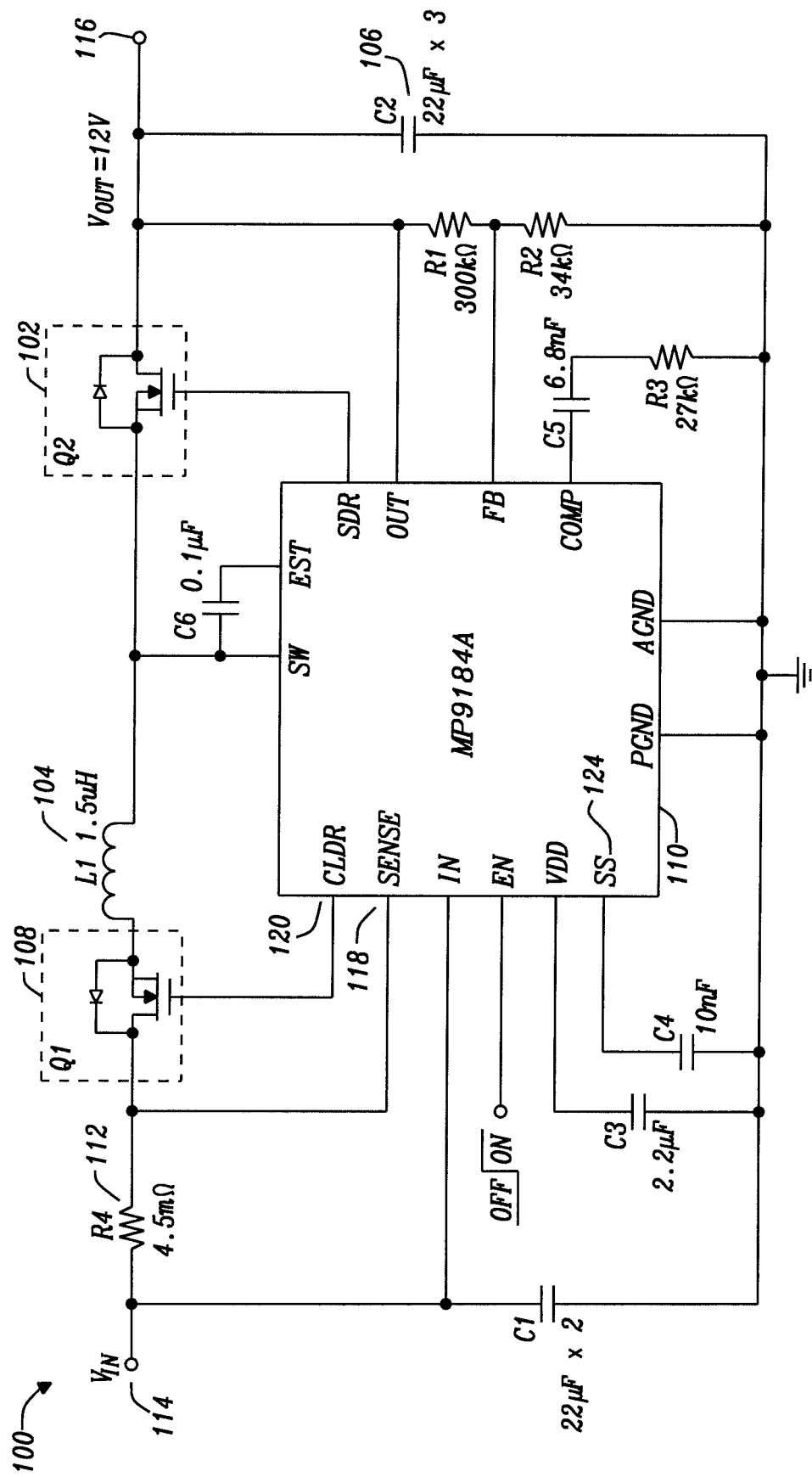
FIG. 1 is a diagram of a conventional N-N boost converter provided with an integrated circuit.
Figure 2:
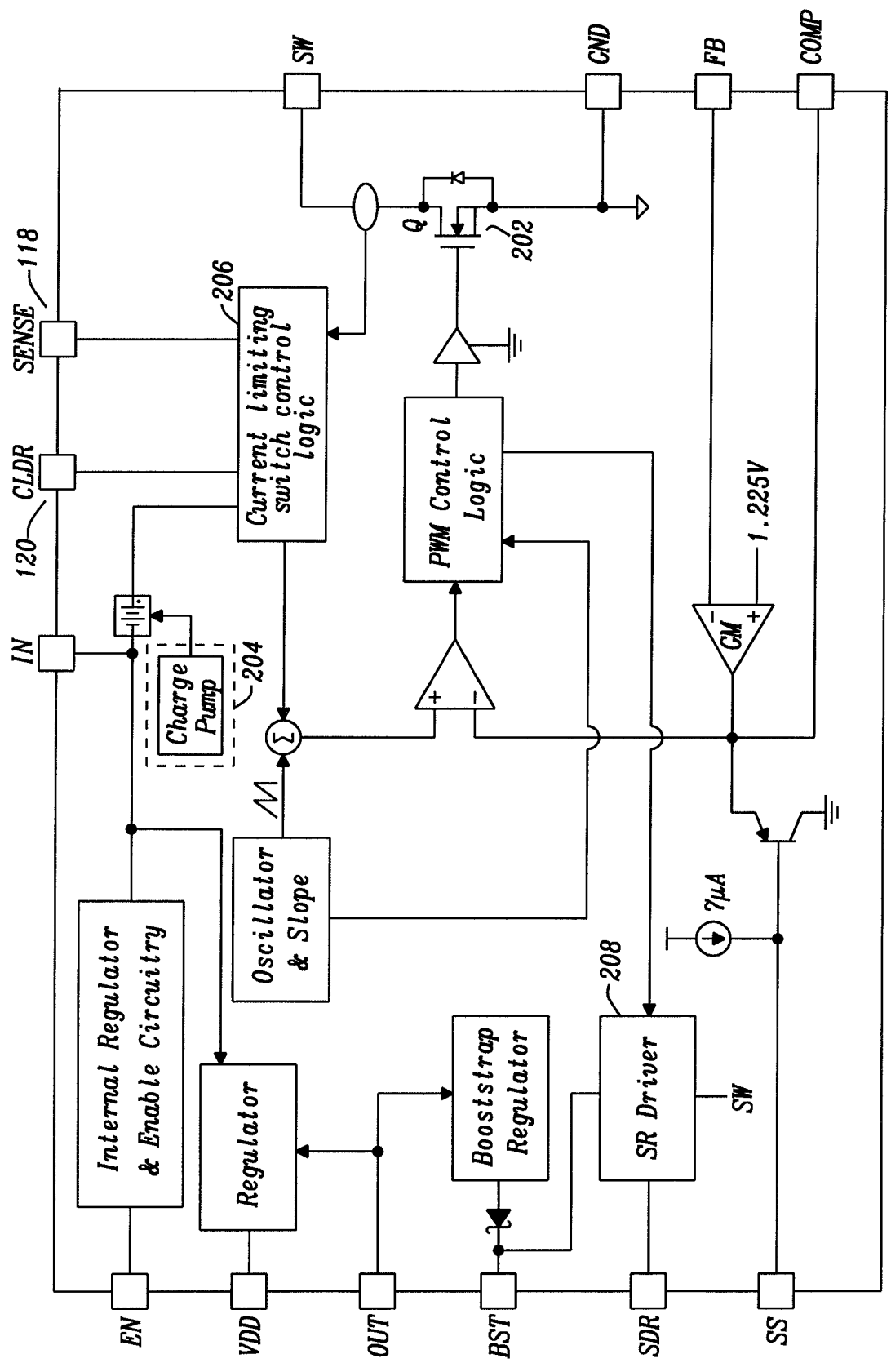
FIG. 2 is a diagram of the integrated circuit of the boost converter of FIG. 1.

FIG. 1 is a schematic diagram of a N-N boost converter 100 implementing soft start-up procedure that includes a pre-charge phase and a boost phase. The boost converter 100 includes an integrated circuit or chip 110 a high side switch 102, a low side switch 202, an inductor 104 and an output capacitor 106. The boost converter 100 is also provided with a current limiting switch 108, a current sense resistor 112, a charge pump 204 and a current limiting switch control logic 206. The current limiting switch 108 and the high side switch 102 are implemented in a so called back-to-back topology in which the intrinsic body diodes of the two switches are oriented antiparallelly with respect to each other. The current limiting switch 108 and the current sense resistor 112 are connected in series between the input 114 of the boost converter and the inductor 104. FIG. 2 illustrates the chip 110 of the circuit of FIG. 2.

In operation, the current flowing through the switch 108 and the inductor 104 is sensed through resistor 112 and fed into the current limiting switch control logic 206 via the SENSE pin 118 of the chip 110. The current limiting switch control logic 206 is configured to limit the input current during the pre-charge phase so that a linear charge current flows from the converter input 114 to the converter output 116 through the switches 108 and 102. The back to back topology of the switches 108 and 102 allows to achieve complete isolation of the load coupled to the boost converter and implement true shutdown of the boost converter. The current limiting switch control logic 206 controls the input current by controlling the gate of switch 108 through the CLDR pin 120 of chip 110 as illustrated in FIG. 2.

A charge pump 204 supplies the current liming switch control logic 206 with a voltage larger than the input voltage Vin, in order to enable the full opening of the high side switch 102 and the full control over the gate of the current limiting switch 108. The use of the charge pump permits to charge the output 116 of the boost converter to a voltage Vout=Vin during the pre-charge phase. Therefore the boost converter 100 requires a dedicated N-type MOSFET switch (108) and a charge pump (206) to implement the pre-charge phase, which increases the complexity and the size of the device.

Figure 3:
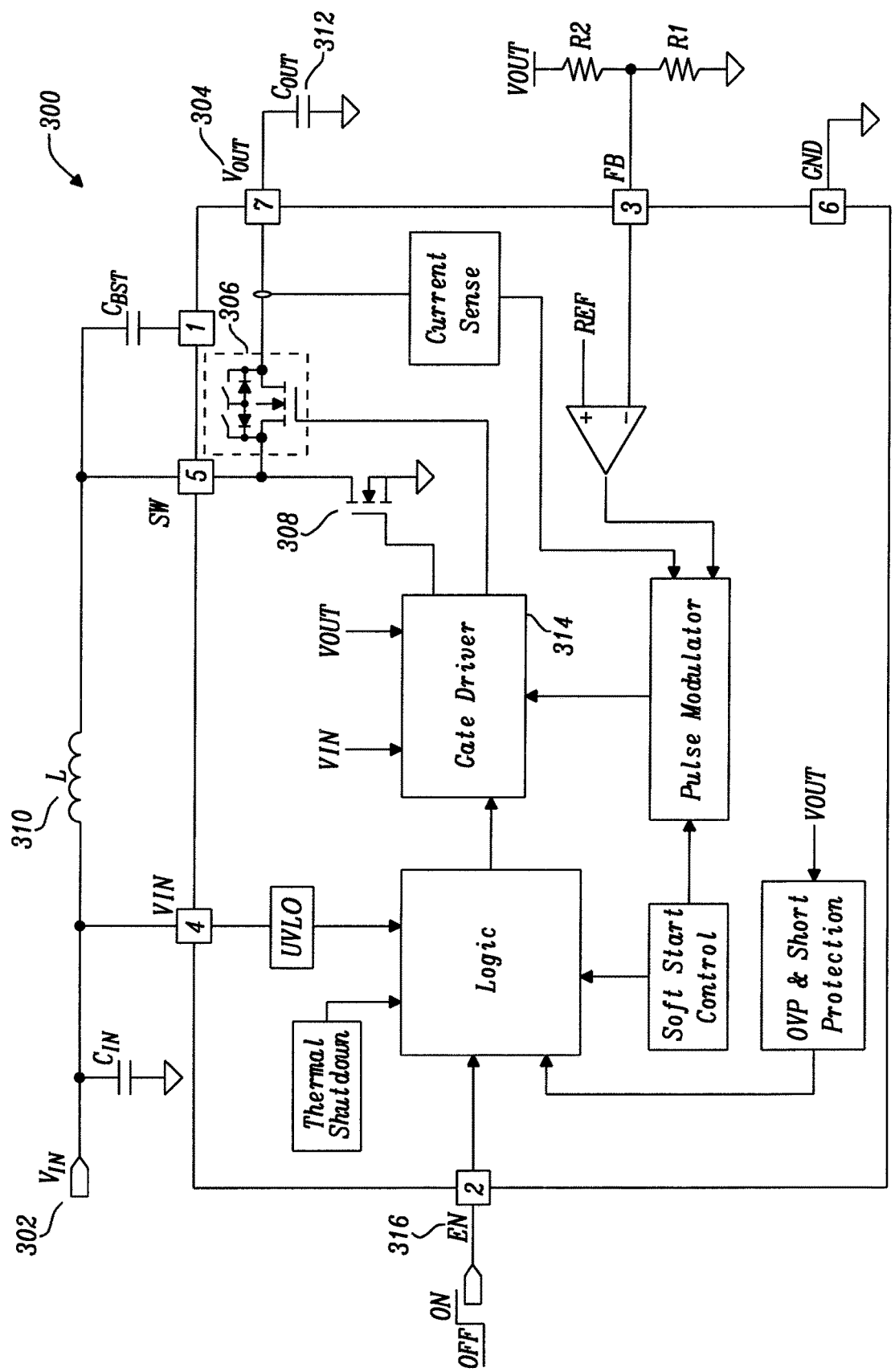
FIG. 3 is a diagram of another N-N boost converter according to the prior art.

FIG. 3 is a schematic diagram of another N-N boost converter according to the prior art. The boost converter 300 has an input 302, an output 304, a high side switch 306, a low side switch 308, an inductor 310, an output capacitor 312 and a gate driver 314 coupled to the high side switch 306. The high side switch 306 is a N-type MOSFET switch and is configured such that the direction of its body can be inverted to isolate a load coupled to the boost converter and achieve true shutdown. This switch topology will be referred to as "body switching" topology.

During the start-up pre-charge phase a linear current flows from the input 302 through the switch 306 and charges the output 304. In comparison with the boost converter of FIG. 1, this design does not need a dedicated charge pump and a current limiting switch to achieve soft start-up. However, due to the operational requirements of the MOSFET switch 306, the output voltage of boost converter 300 can only rise up to Vin-115 mV during the pre-charge phase. This voltage gap varies with different process, voltage and temperature (PVT) conditions and causes an inrush current at the beginning of the start-up boost phase, as illustrated in FIG. 4.

Figure 4:
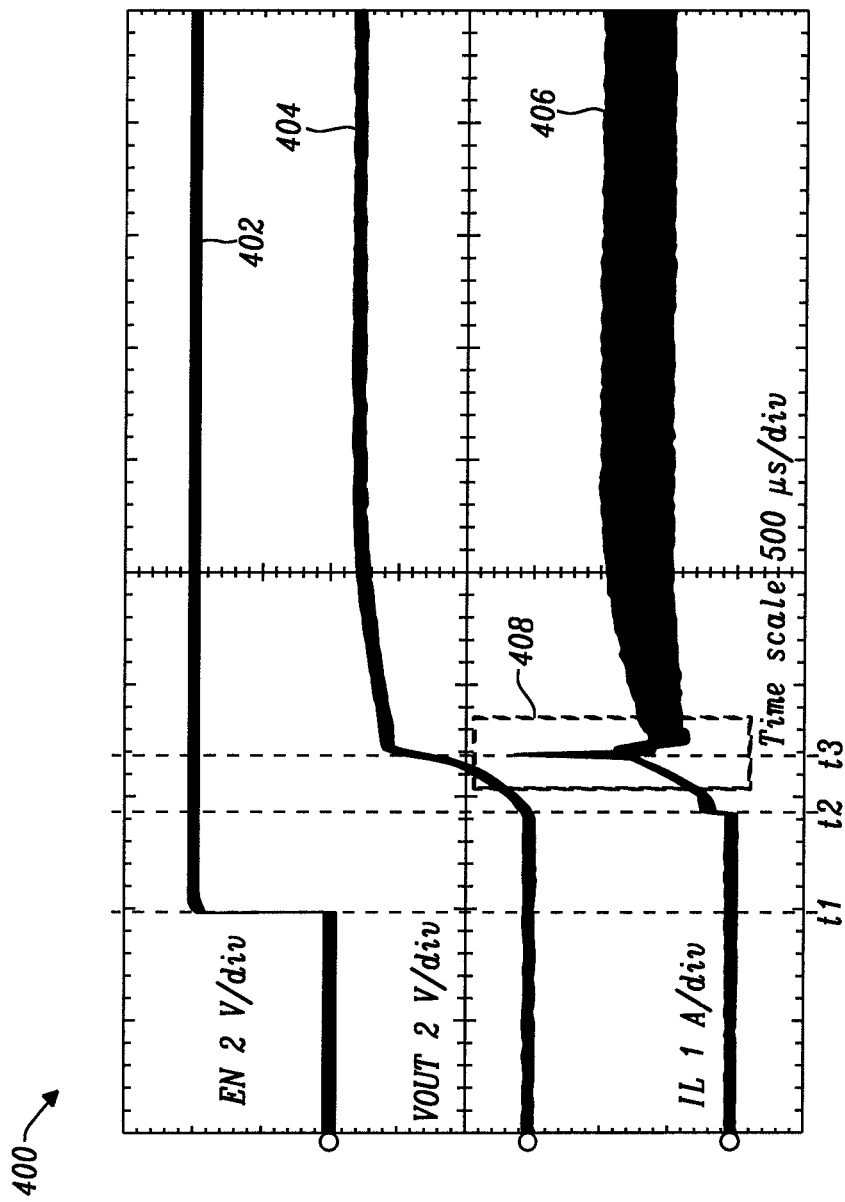
FIG. 4 is a time chart illustrating the working of boost converter of FIG. 3 at start-up.

FIG. 4 is a time chart illustrating the working of the prior art boost converter of FIG. 3. The graph 400 shows the voltage signal 402 at the enable pin 316 of the boost converter 300, the voltage 404 at the output 304 and the current 406 through inductor 310. These measurements were obtained for an output voltage Vout of 5V, an input voltage Vin of 3.6 V, an output resistance Rout of 5 ohms, and a temperature TA of 25 degrees.

At a time t1 the enable pin is pulled high and the apparatus 300 is enabled. At time t2 the pre-charge start-up phase is initiated and a linear current charges the output capacitor 306 so that the output voltage ramps up linearly. At time t3 the pre-charge phase ends and the device enters the start-up boost phase. As mentioned above, the voltage gap between the output and input voltage at the end of the pre-charge phase causes a current spike on the inductor 310 illustrated by the spike 408 at time t3.

Figure 5:
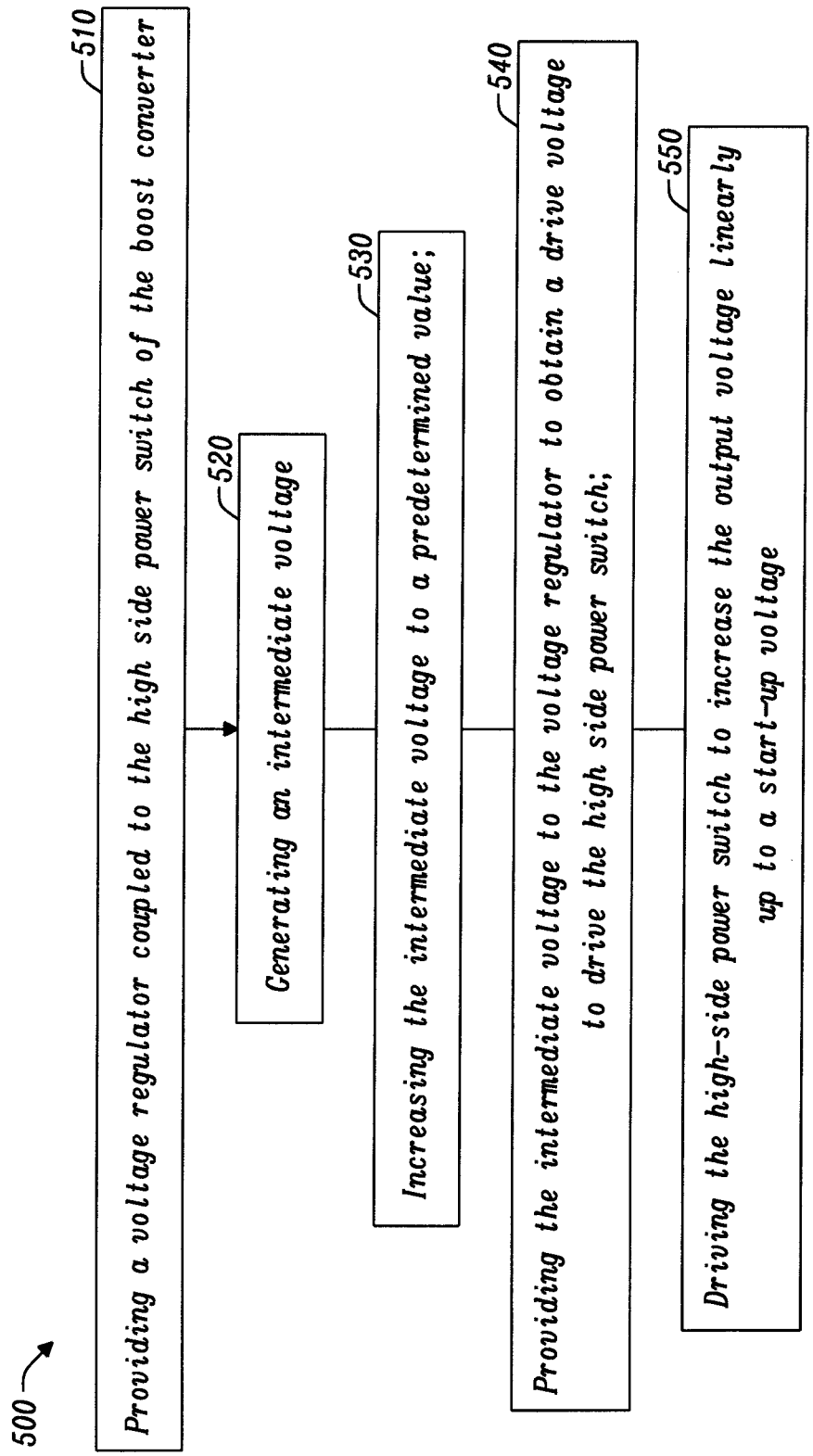
FIG. 5 is a flowchart of a method for pre-charging a boost converter according to the disclosure.

FIG. 5 is a flow chart of a method for pre-charging a boost converter that includes a low-side power switch coupled to a high-side power switch at a switching node, an input terminal for receiving an input voltage and an output terminal for providing an output voltage.

At step 510 a voltage regulator is coupled to the high-side power switch. At step 520 an intermediate voltage is generated. At step 530 the intermediate voltage is increased to a predetermined value. The predetermined value may be greater than the input voltage, for instance the predetermined value may be twice the input voltage. At step 540 the intermediate voltage is provided to the voltage regulator to obtain a drive voltage to drive the high side power switch. At step 550 the high-side power switch is driven with the drive voltage to increase the output voltage linearly up to a start-up voltage.

Using the proposed method a boost converter can be operated in a start-up phase or mode, in which the output voltage increases up to a start-up voltage. At the end of the start-up phase the boost converter is then ready to operate in a boost phase or mode, in which the output voltage of the boost converter is greater than the input voltage.

The method illustrated in FIG. 5 allows the boost converter to perform the pre-charge phase without using a dedicated charge pump and eliminates the initial current spike intrinsic to some prior art boost converters (such as the current spike 408 illustrated in FIG. 4) since the output voltage is equal to the input voltage at the end of the pre-charge phase.

Figure 6:
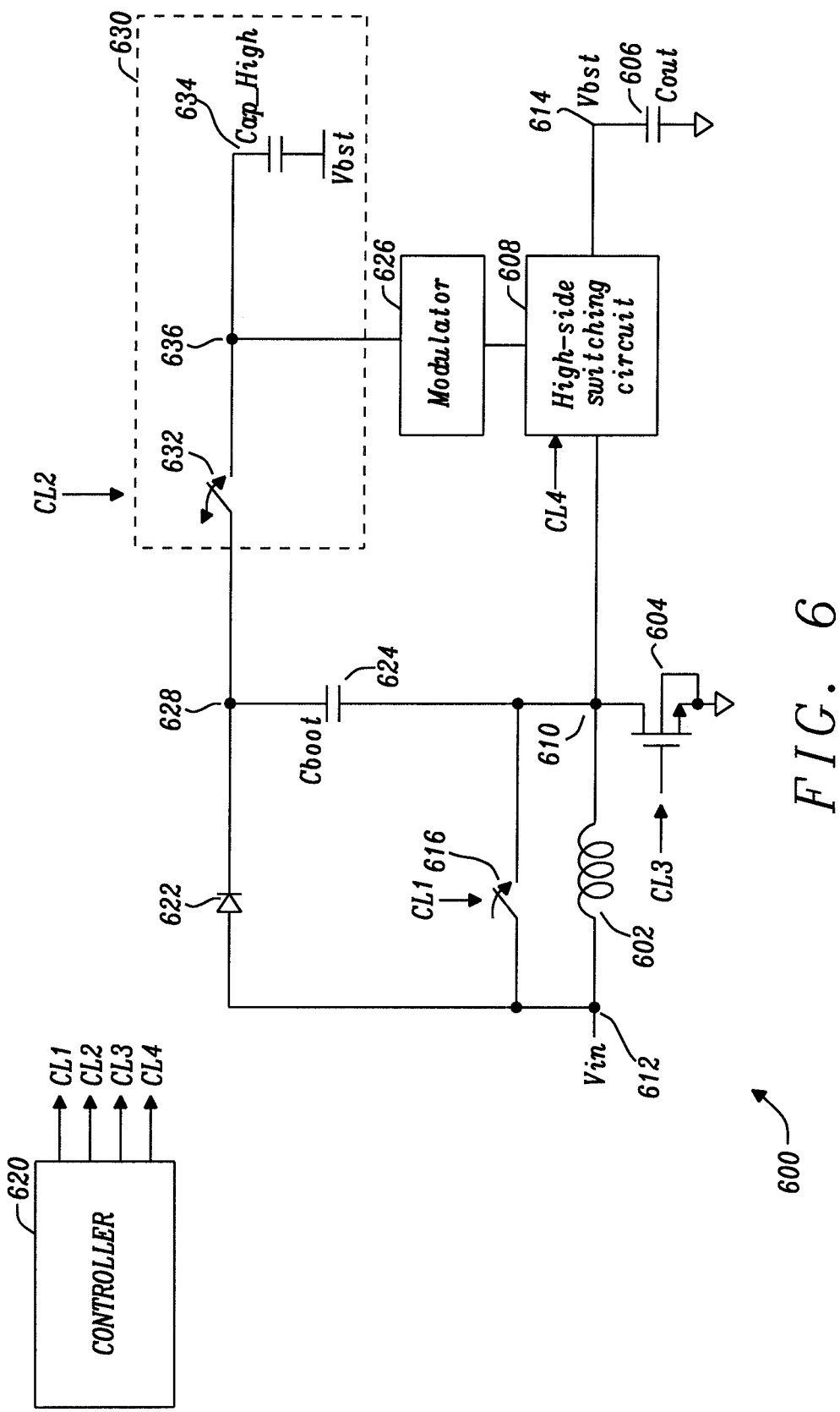
FIG. 6 is a diagram a boost converter for implementing the method of FIG. 5.

FIG. 6 is a schematic diagram of a N-N boost converter for implementing the start-up method of FIG. 5. The boost converter 600 includes an inductor 602 coupled to a low side power switch 604 and a high side power switch circuit 608. The converter is also provided with a rectifier such as a half-wave rectifier 630, a modulator or voltage regulator 626, a bootstrap circuit and an anti-ringing switch 616 also referred to as bypass switch.

The modulator or voltage regulator 626 is adapted to regulate a control voltage of the high side switching circuit 608. The voltage regulator 626 may be implemented in different fashions. For instance the voltage regulator may be a clamp circuit.

A controller 620 is configured to provide a plurality of control signals for operating various components of the boost converter 600. For example, the plurality of control signals may comprise four signals CL1, CL2, CL3, CL4 in which CL1 controls the anti-ringing switch 616, CL2 controls the rectifier switch 632, CL3 controls the low-side power switch 604 and CL4 controls the high side power switch circuit 608.

The high side power switch circuit 608 may include one or more power switches. The low side power switch 604 and the one or more power switches of the high side circuit 608 may be implemented by N-type MOSFET switches. The anti-ringing switch 616 may be implemented by a N-type transistor switch such as a N-type MOSFET switch.

The inductor 602 has a first terminal coupled to the input 612 and a second terminal coupled to the switching node 610. The low side power switch 604 has a first terminal for receiving the control signal CL3, a second terminal, for example a drain terminal coupled to the switching node 610, and a third terminal, for example a source terminal coupled to ground. The high side power switch circuit 608 has a first terminal for receiving an output from the modulator 626, a second terminal coupled to the switching node 610 and a third terminal coupled to the output node 614. An output capacitor 606 is provided between the output node 614 and ground. The bootstrap circuit may be formed by a bootstrap diode 622 and a bootstrap capacitor 624. In this example, the bootstrap capacitor 624 is provided between the switching node 610 and a bootstrap node 628, while the bootstrap diode 622 is provided between the input node 612 and the node 628. Alternatively, the bootstrap diode 622 may be replaced by a bootstrap switch to avoid diode voltage drop.

In this example the rectifier 630 is formed by a rectifier switch 632 coupled to an energy storage element such as a rectifier capacitor 634. The rectifier switch 632 has a first terminal coupled to the bootstrap node 628 and a second terminal coupled to a first terminal of the capacitor 634. The second terminal of the capacitor 634 is coupled to the output node 614. Alternatively the second terminal of the capacitor 634 may be coupled to ground. When the capacitor 634 is coupled to the output node 614, the capacitor does not need to be implemented as a high voltage capacitor, hence reducing the footprint of the converter. The modulator 626 has an input coupled to the output 636 of the rectifier 630 and an output coupled to the high side power switch circuit 608. In a preferred embodiment the modulator 626 is an analog modulator, however the modulator may also be implemented as a digital modulator. The rectifier switch 632 may be implemented by a P-type transistor switch such as a P-type MOSFET switch.

At start-up, the boost converter 600 is configured to charge the capacitors 624 and 634 so that a power supply is made available for the modulator 626 to drive the high side switching circuit 608 without needing a dedicated charge pump and current limiting switch as in some prior art boost converters. The modulator drives the high side switching circuit 608 such that the output voltage Vbst increases linearly during the pre-charge phase.

During the pre-charge phase, hence when Vout<Vin, the switch 616 is used to provide a current returning path to prevent overcharging of the switching node. When operating in boost mode, the switch 616 is used to minimize the ringing at the switch node 610 caused by the parasitic capacitances and inductances of the circuit. Avoiding the use of a dedicated charge pump allows for a reduced design complexity and implementation area. Hence cost and time of boost converter fabrication are also lower.

Figure 7:
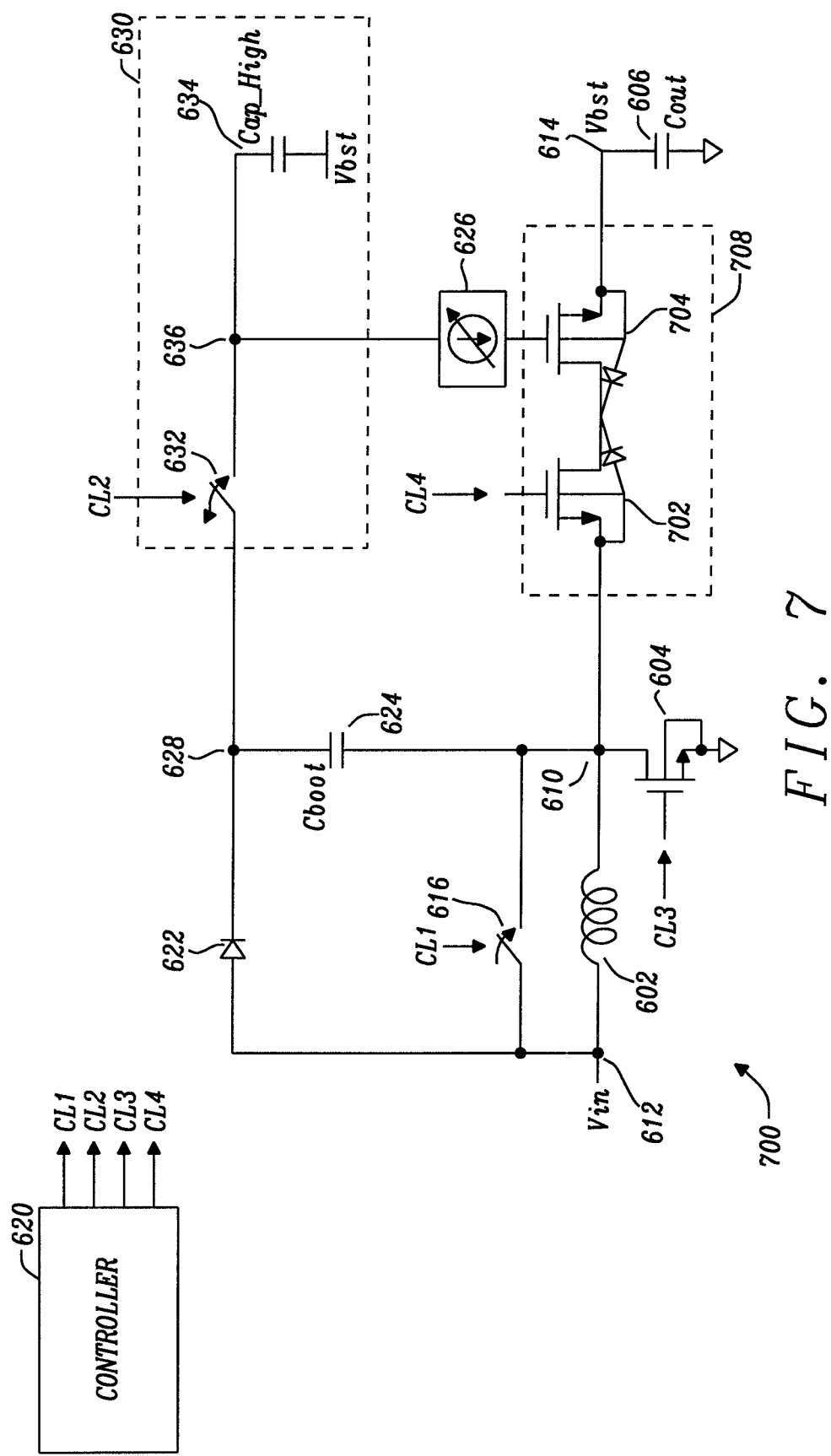
FIG. 7 is an exemplary embodiment of the boost converter of FIG. 6.

FIG. 7 illustrates an exemplary embodiment of the boost converter of FIG. 6. The circuit of FIG. 7 shares similar components to those illustrated in FIG. 6, so the same reference numerals have been used to represent corresponding components and their description will not be repeated for sake of brevity.

The high side power switching circuit 708 comprises a first high side power switch 702 and a second high side power switch 704 coupled back-to-back. The low-side power switch 604 and the high side power switches 702 and 704 are implemented as N-type MOSFET switches. The source terminal of the second high side power switch 704 is coupled to the output node 614, while the source of the first high side power switch 702 is coupled to the switching node 610. The drain terminals of the first and second power switches are coupled to each other. This back-to-back topology allows to achieve load disconnection and implement true shutdown of the boost converter.

The gate of the low side power switch 604 is controlled by the digital control signal CL3, which is responsible for enabling the switching operation of the boost converter. Similarly, the gate of the first high side power switch 702 is controlled by the digital control signal CL4. The gate of the second high side power switch 704 is controlled by the analog modulator 626 which is responsible for enabling the linear charging of the output 614 during the pre-charge phase. Once the pre-charge phase is completed, the second high side power switch 704 will be constantly on and act as a small resistor in series with the first high side power switch 702. In boost mode, that is when the output voltage Vout is greater than the input voltage Vin, the boost switching operation is achieved by the low side power switch 604 and the first high side power switch 702.

During the pre-charge phase the boost converter 700 operates according to the pre-charge switching method of FIG. 5. According to this pre-charge switching method each switching cycle can be described by four steps, that are illustrated in FIGS. 8A to 11A and 8B to 11B. In this example, the modulator 626 is an analog modulator and the control signals CL1 to CL4 are digital modulated signals. For example, CL1 to CL4 might be pulse width modulated signals.

FIG. 8A shows the state, either on (closed) or off (open) of the switches of the N-N boost converter 700 during a first time interval Δt1 of the pre-charge switching cycle between the times t0 and t1 in FIG. 8B.

FIG. 8B shows the temporal evolution of various voltages and current signals of the N-N boost converter during the first time interval Δt1 of the pre-charge switching cycle. The lineplot 812 represents the temporal evolution of the current through the inductor 602 (ILX). The lineplot 814 represents the temporal evolution of the current at the output of the boost converter 614 (Ivbst). The lineplot 816 represents the temporal evolution of the current through the anti-ringing switch 616 (Iatr). The lineplot 822 represents the temporal evolution of the voltage at the switching node 610 (VLX). The lineplot 824 represents the temporal evolution of the voltage at the bootstrap node 628 (Vboot). The lineplot 826 represents the temporal evolution of the voltage at the rectifier node 636 (VHIGH). The lineplot 832 represents the temporal evolution of the voltage at the output of the N-N boost converter 614 (Vbst).

During the first time interval Δt1, the anti-ringing switch 616, the first high side power switch 702 and the rectifier switch 632 are off, hence the currents Iatr and Ivbst are zero, as shown in lineplots 816 and 814 respectively. The low side power switch 604 is on, hence the current ILX increases linearly and charges the inductor 602 (lineplot 812). The increase rate of the current ILX is equal to Vin/L, where Vin is the voltage at the input 612 of the N-N boost converter and L is the inductance of the inductor 602. The bootstrap diode 622 is forward biased and a current Iboot charges the bootstrap capacitor 624.

During this time interval the voltage VLX at the switch node 610 (lineplot 822) is zero. Assuming that the forward diode voltage drop of 622 is very small, then the voltage Vboot at the boot node 628 (lineplot 824) is approximately equal to Vin and the voltage VHIGH at the rectifier node 636 (lineplot 826) is equal to Vboot minus a diode drop voltage, due to the intrinsic body diode 804 of the rectifier switch 632. The rectifier capacitor 634 is charged to Vin minus a diode drop. The output of the N-N boost converter (lineplot 832) is zero since no current is flowing through the high side portion of the circuit.

Figure 9B:
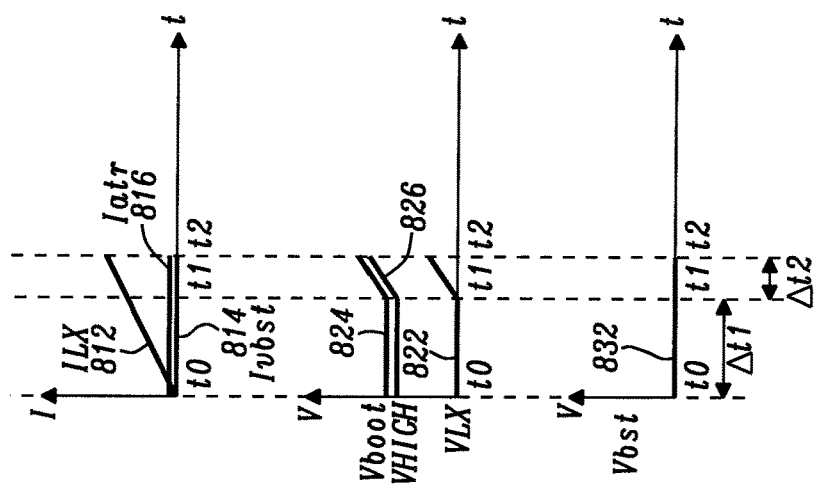
FIG. 9B is a time chart illustrating the currents and voltages in circuit of FIG. 7 during the second time interval.
Figure 9A:
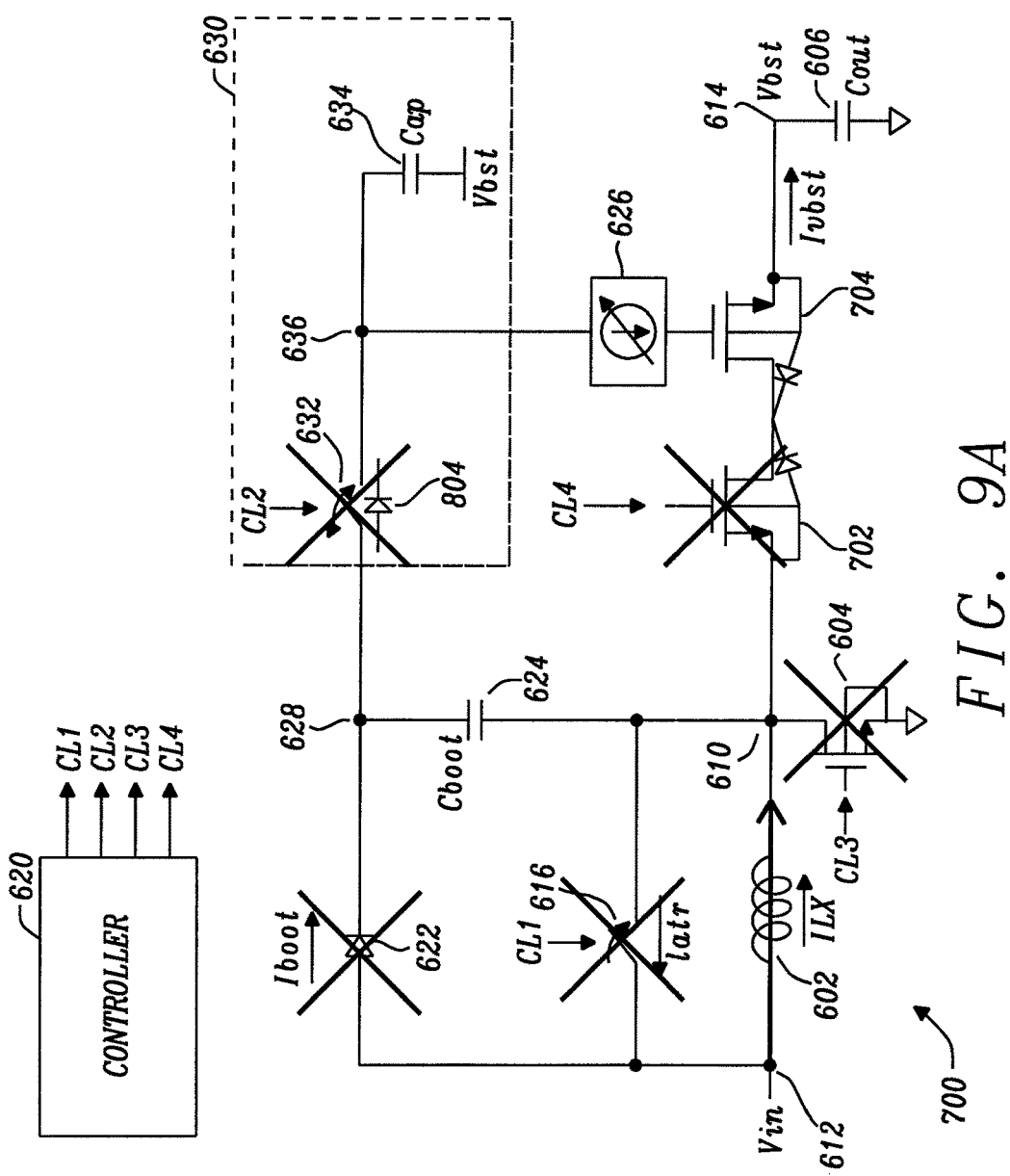
FIG. 9A is a schematic illustrating the states of the switches of the circuit of FIG. 7 during a second time interval.

FIG. 9A and FIG. 9B are analogous to FIGS. 8A and 8B respectively but refer to a second time interval Δt2 of the switching cycle corresponding to the interval between t1 and t2 in FIG. 9B. This interval serves as a transition to ensure that the first high side power switch 702 is only turned on after the low side power switch 604 has been turned off. During this interval the anti-ringing switch 616 and the first high-side switch 702 are off hence the currents Iatr and Ivbst and the output voltage Vbst are still zero, as shown in lineplots 816, 814 and 832 respectively. The inductor current continues to charge the switch node 610 which is now disconnected from ground, hence the switch node voltage VLX (lineplot 822) rises linearly.

During the second time interval the bootstrap diode 622 becomes reverse biased and there is no current flowing from the input to the bootstrap node 628. The voltage of the bootstrap capacitor 624 varies with the voltage VLX, hence Vboot (lineplot 824) and VHIGH (lineplot 826) also increase linearly during the second time interval. As mentioned above the bootstrap diode may be replaced by a bootstrap switch. In this case the bootstrap switch is switched off (open) during the second interval.

Figures 10A, 10B:
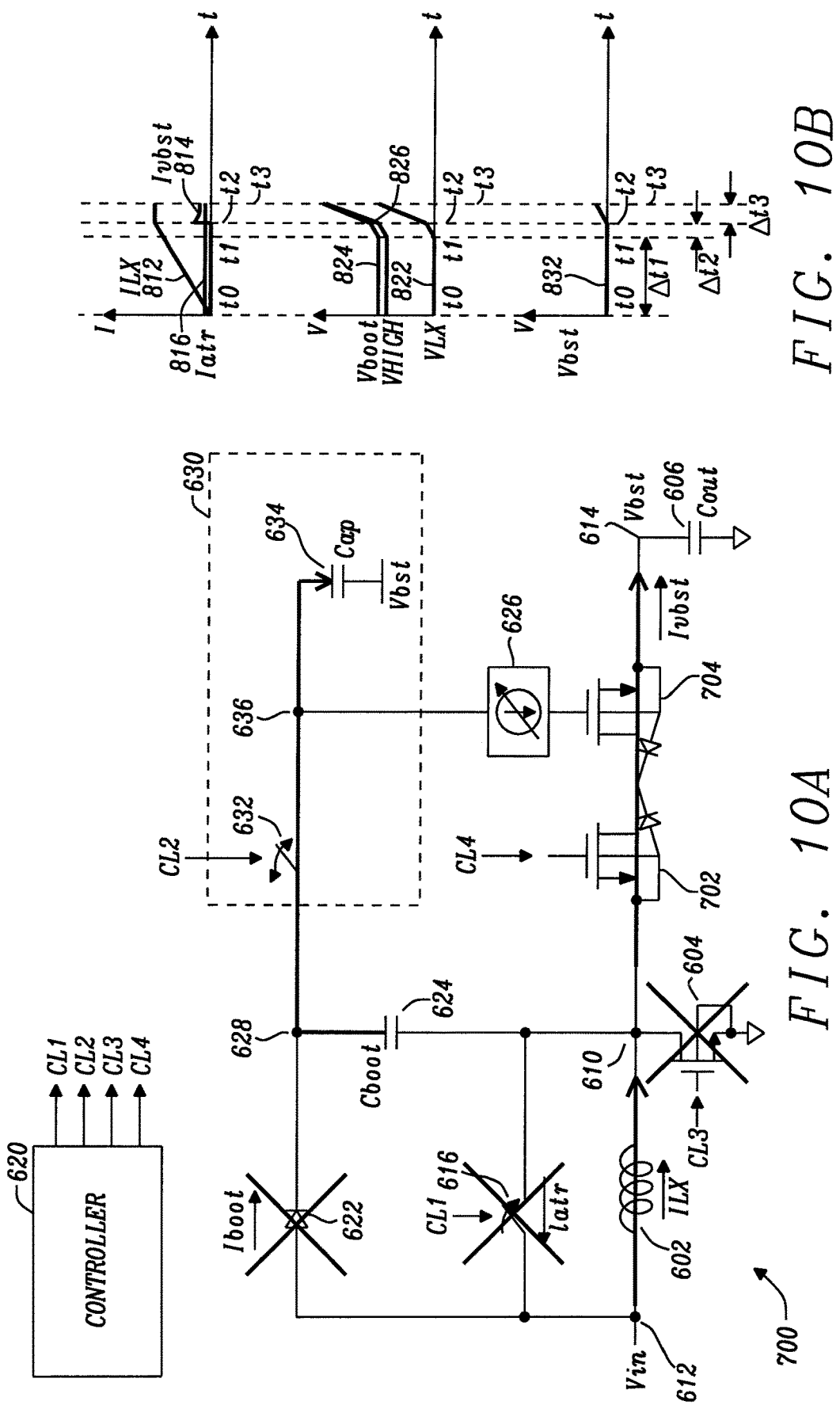
FIG. 10A is a schematic illustrating the states of the switches of the circuit of FIG. 7 during a third time interval.
FIG. 10B is a time chart illustrating the currents and voltages in circuit of FIG. 7 during the third time interval.

FIG. 10A and FIG. 10B are analogous to FIGS. 8A and 8B respectively but refer to a third time interval Δt3 of the switching cycle between times t2 and t3 in FIG. 10B. During the third time interval the anti-ringing switch 616 is still off hence there is no current Iatr (lineplot 816). The first high side power switch 702 and the rectifier switch 632 are on, the low side power switch 604 is off and the bootstrap diode 622 is reverse biased. With the high side circuit path open, the current can now flow from the inductor 602 to the output 614, hence Ivbst (lineplot 814) and Vbst (lineplot 832) are no longer zero. The analog modulator 626 is configured to control the gate of the second high side switch 704 such that the output voltage 614 increases linearly (lineplot 832).

The current through the inductor ILX, remains at peak value during this interval, while the voltage at switching node 610 increases linearly (lineplot 822). The switch node voltage VLX rises to a level slightly above the input voltage, causing Vboot to rise to a level defined by Vboot=Vin+VLX. The level can be any value greater than Vin+threshold voltage of the high side power switch 704. For instance Vboot may rise to around 2Vin (lineplot 824). Since the rectifier switch 632 is now on, VHIGH is equal to VBoot and current flows through VHIGH charging the rectifier capacitor 634 (lineplot 926). The duration of the third time interval should be chosen in order to prevent the voltage at switching node 610 to increase to unsafe levels. For example, the boost converter 700 might be configured such that the third time interval lasts for around 3 ns.

Figures 11A, 11B:
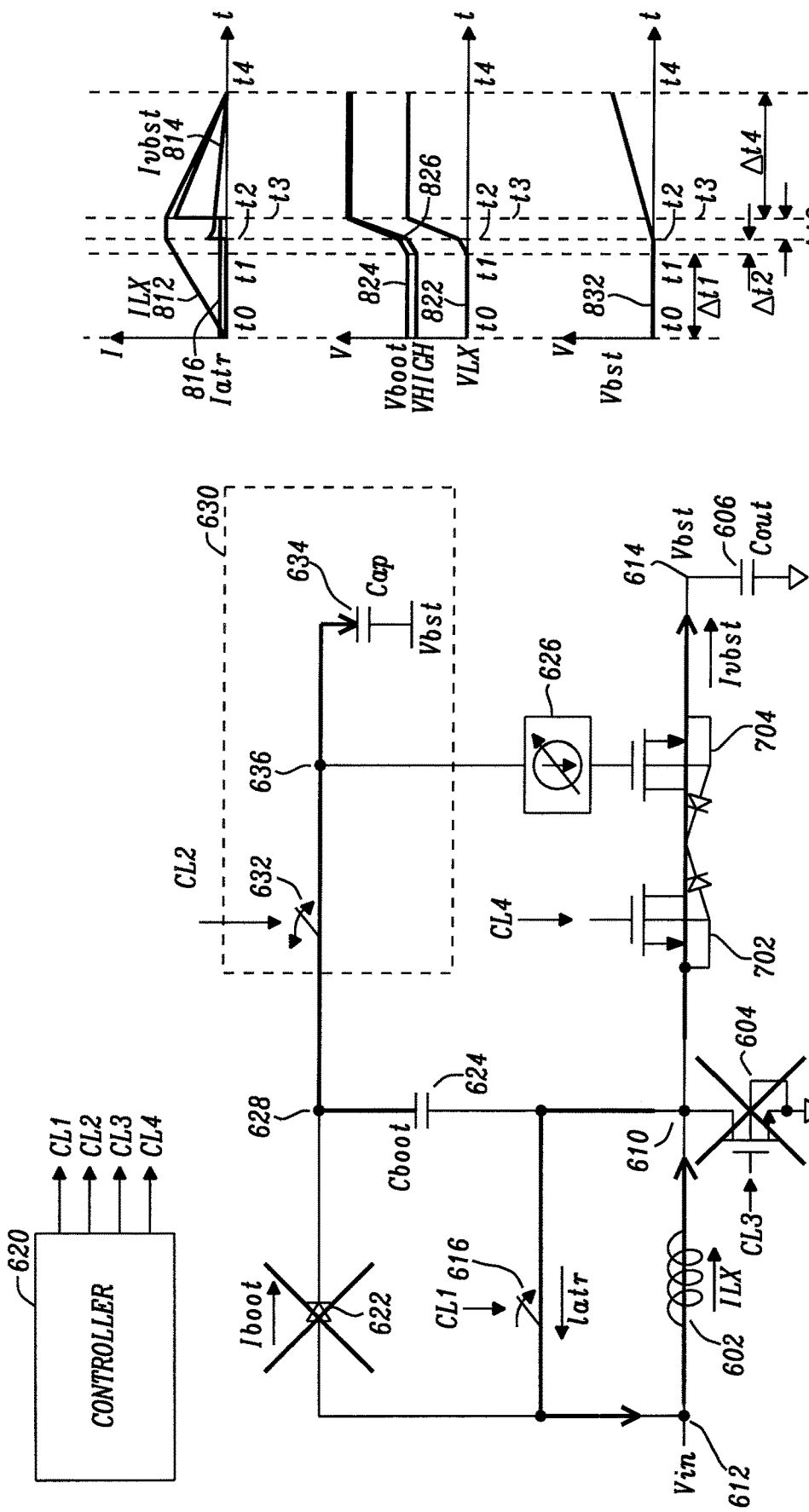
FIG. 11A is a schematic illustrating the states of the switches of the circuit of FIG. 7 during a fourth time interval.
FIG. 11B is a time chart illustrating the currents and voltages in circuit of FIG. 7 during the fourth time interval.

FIG. 11A and FIG. 11B are analogous to FIGS. 8A and 8B respectively but refer to a fourth time interval Δt4 of the switching cycle corresponding to the interval between t3 and t4 in FIG. 11B. During the fourth time interval the anti-ringing switch 616 is on and there is a non-zero current Iatr flowing from the switch node 610 towards the input. This ensures that the switching node 610 is not charged excessively above Vin, which could create dangerous circuit conditions. The switching node is now connected to the input 612 and the voltage VLX may be expressed as VLX=Vin+Iatr*R616 in which R616 is the resistance of the switch 616. Since the current Iatr is falling, the voltage VLX is decreasing very slowly (lineplot 822). The current ILX through the inductor 602, and therefore the current Iatr through the anti-ringing switch 616, decrease linearly (lineplot 812).

The current through the second high-side power switch 704 is still regulated by the analog modulator 626 such that the output voltage Vbst increases linearly (lineplot 606). Since the voltage at the rectifier node 636 is 2Vin, the analog modulator 626 has enough supply to fully boost the output voltage to Vin, which ensures when the pre-charge procedure is finished, and the boost operation is started that there will be no initial inrush current.

After the time t4 all switches are turned off, then the low side power switch 604 is turned on once again, hence starting a new cycle. The voltage VLX at the switching node 610 drops to zero and Vboot drops to Vin. So during the pre-charge phase the Vboot waveform is a pulse voltage which repeats periodically over multiple cycles; the rectified voltage VHIGH remains constant, while the boost voltage Vbst keeps rising.

FIG. 12 illustrates an anti-ringing switch. The anti-ringing switch 1200 comprises a first switch 1202, a second switch 1204 and a driver 1206. In this specific implementation the first and second switches are implemented by MOSFETs. The driver 1206 has an input coupled to the control signal CL1 and an output coupled to the gates of the first (1202) and second (1204) switch respectively. The sources of the two switches are coupled together, the drain of the first switch is coupled to the input terminal 612 of the boost converter 600 and the drain of the second switch 1204 is coupled to the switching node 610. The driver 1206 has a positive power supply pin 1208 coupled to the bootstrap node 628 and a negative power supply pin 1210 coupled to the switch node 610.

The operation of the anti-ringing switch 1200 is illustrated with reference to FIG. 13A and FIG. 14A, that are schematic diagrams of a basic boost converter without and with anti-ringing switch respectively. The boost converter 1300 is implemented in a similar way to boost converter 600 and it comprises an inductor 1302, a low side switch 1304, a high side switch 1306 and an output capacitor 1308 arranged as previously described for the boost converter 600. FIGS. 13B and 14B are graphs showing the temporal evolution of the current at a switch node 1310 of the boost circuit without and with anti-ringing switch respectively. The lineplot 1312 shows the typical waveform of the current through the inductor of a boost converter. Between a time t0 and a time t1 the low side switch 1304 is on and the high side switch 1306 is off and the current ILX ramps up. At time t1, the low side switch 1304 is turned off, the high side switch 1306 is turned on and the current ILX starts decreasing. When the current reaches zero at time t2, also referred to as zero crossing event, the high side switch 1306 is turned off to prevent negative current flowing to the output, which would reduce the efficiency performance of the boost converter. When both the switches 1304 and 1306 of the boost converter are off there may be ringing effects caused by parasitic capacitances and inductances, as shown by the oscillations 1320 of lineplot 1312 in FIG. 13B. By adding the anti-ringing switch 1200 between the switch node 1310 and the input of the boost converter 1300, an alternative path is provided for the current ILX to flow through and the ringing oscillations are largely suppressed, as shown in FIG. 14B.

In a standard boost converter, the anti-ringing switch 616 would normally be activated only when the inductor current ILX decreases to zero and both the low and high side switch are forced open. In the method and boost converter according to the present disclosure the anti-ringing switch is turned on during the pre-charge phase as described above, to avoid overcharging the LX node, hence the new method of operation of the anti-ringing switch can be implemented simply by configuring the controller 620 to provide a customized digital signal CL1 for controlling the anti-ringing switch 616.

As mentioned above, during start-up the controller 620 controls the switches operation in accordance with the method of FIG. 5 via a plurality of control signals. For example, in the embodiment of FIG. 7, the controller controls the anti-ringing switch 616 via control signal CL1, the rectifier switch 632 via control signal CL2, the low side switch 604 via control signal CL3 and the first high side switch 702 via control signal CL4. In this embodiment all control signals are digital, however in other embodiments the control signals might be implemented by non-digital signals. It will be appreciated that the controller may be implemented as a central controller or as separate units.

Figure 15:
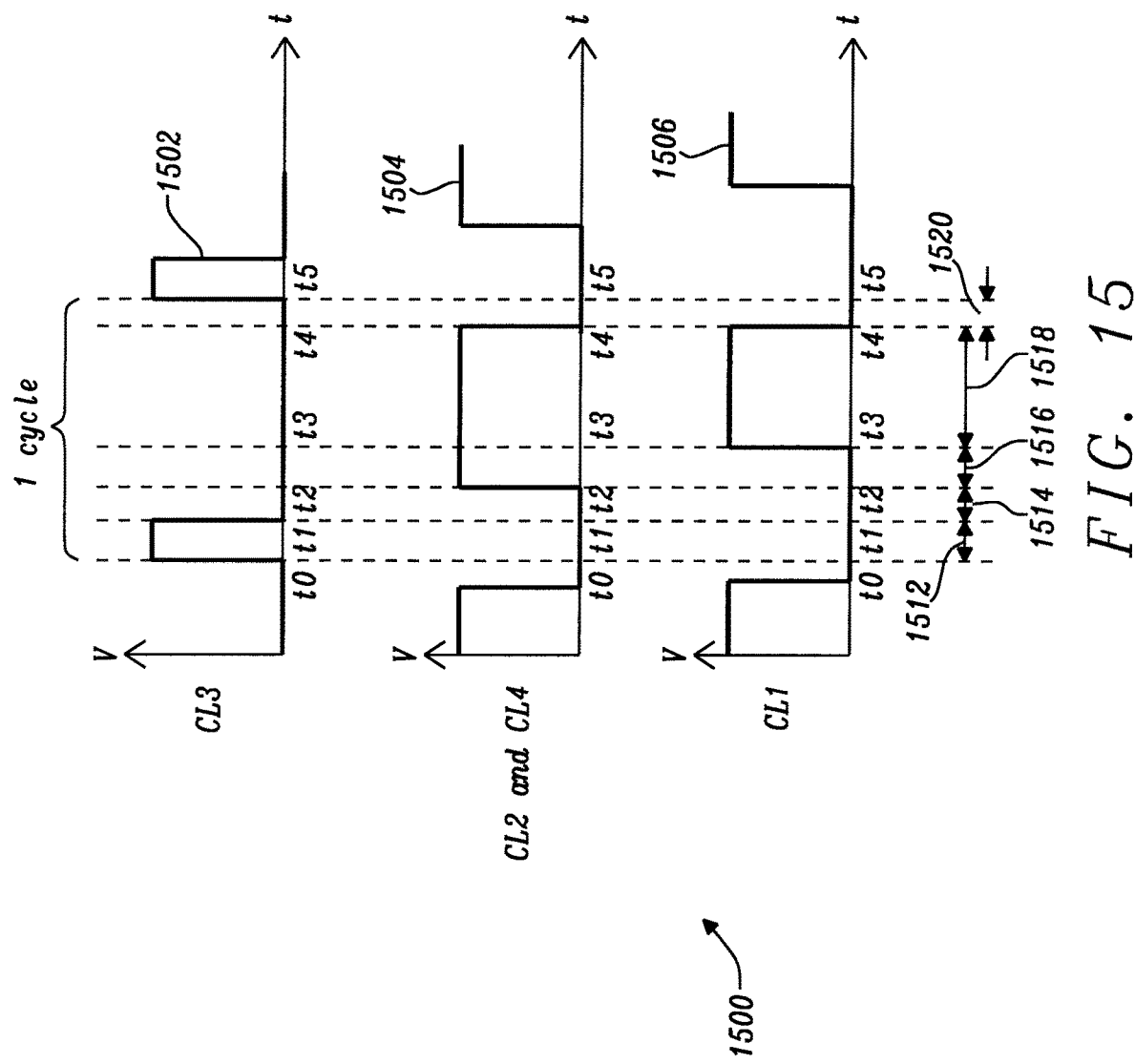
FIG. 15 is a plot illustrating an example digital implementation of the digital control signals of the boost converter of FIG. 7.

FIG. 15 shows a possible digital implementation of the digital control signals of the embodiment of FIG. 7 during one switching cycle of the pre-charge method according to the present disclosure. The graph 1500 shows the temporal evolution of the voltage level of signals CL1 (1506) controlling the anti-ringing switch 616, signal CL3 (1502) controlling the low side switch 604; and signal CL4 (1504) controlling the first high side switch 702. The rectifier switch and the first high side switch are always on and off simultaneously. If the rectifier switch is implemented as a P-type MOSFET switch and the first high side switch as a N-type MOSFET switch, then the control signal CL2, should be equal to the inverse of control signal CL4.

The control signals vary between a low voltage and high voltage corresponding to a logic zero and a logic one respectively. For N-type MOSFET switches, the switch is on when the corresponding control signal is at the logic high and off when the corresponding control signal is at the logic low.

During a first time interval 1512 (between time t0 and time t1) only the low side switch 604 is on. This time interval corresponds to the step illustrated in FIGS. 8A and 8B. During a second time interval 1514 (between time t1 and time t2) all the switches are off. This time interval corresponds to the step illustrated in FIGS. 9A and 9B. During a third time interval 1516 (between time t2 and time t3) the rectifier switch 632 and the first high side switch 702 are on but the anti-ringing switch 616 is still off. This time interval corresponds to the step illustrated in FIGS. 10A and 10B. During a fourth time interval 1518 (between time t3 and t4) the anti-ringing switch 616, the first high-side switch 702 and the rectifier switch 732 are on, while the low side switch 604 is off. This time interval corresponds to the step illustrated in FIGS. 11A and 11B. During a fifth time interval 1520 (between time t4 and t5) all the switches are turned off for a short time after which the low side switch 604 is turned on again and the cycle repeats. The cycles will repeat until the boost voltage Vbst reaches the desired predetermined value, for instance Vin. At this point the pre-charge phase ends and the boost converter starts operating in boost mode.

The second and fifth time intervals serve as buffer times, or non-overlap times, to ensure that the low side switch 604 is never on at the same time as the high side switch 704.

The duration of the time intervals may vary depending on the application. As an example, the whole cycle might last 1 µs, the low side switch 604 might be kept on for about 30 ns and the non-overlap times might be 1 to 3 ns. Then the first time interval would be 30 ns, the second, third and fifth time intervals would be 1 to 3 ns and the fourth time interval would be the difference between 1 µs and the other time intervals. The duration of the cycle and the time the low side switch is on (first time interval 1512) determines how fast the bootstrap capacitor 624 is charged up to 2Vin.

Although the control signals CL1, CL2, CL3, CL4 of the embodiment of FIG. 7 are periodic, in other embodiments they might not be. For example, the control signals CL1, Cl2, CL3, CL4 might be implemented as one-shot control signals which do not toggle periodically, as long as they are configured such that the voltage of the bootstrap capacitor 624 (Vboot) and the voltage at the rectifier node 636 (VHIGH) can reach a high enough level to pre-charge the output voltage to Vin before entering the boost phase.

Figure 16:
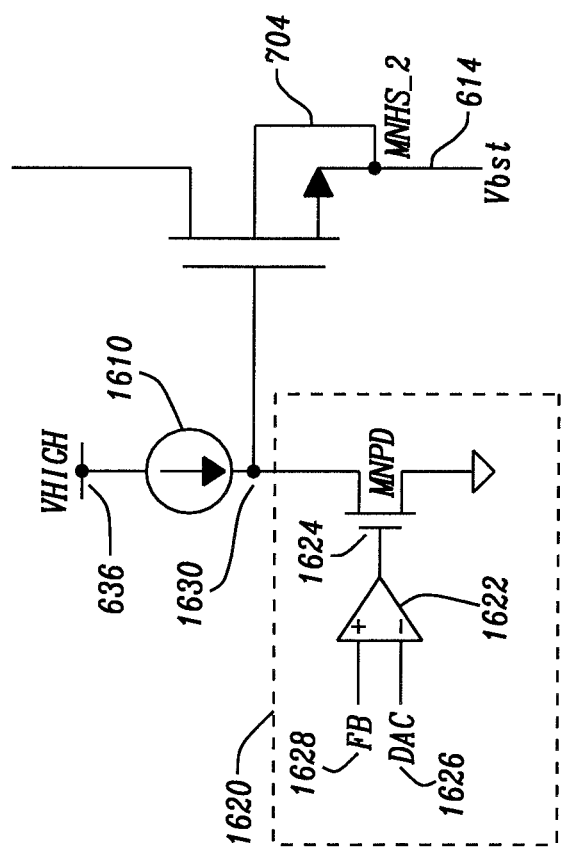
FIG. 16 is a diagram of an analog modulator.

FIG. 16 shows a possible implementation of the analog modulator 626. In this example, the modulator 626 is implemented as a simple low dropout (LDO) regulator comprising a current source 1610 and a voltage regulation loop 1620. The current source 1610 has an input coupled to the rectifier node 636 and an output coupled to a gate node 1630. The voltage regulation loop 1620 comprises a differential amplifier 1622 and a pull-low switch 1624. In this specific example the pull-low switch 1624 is implemented as a N-type MOSFET switch, however other types of switches may be used. The drain of the pull-low switch 1624 is coupled to the gate of the second high side switch 704 and to the output of the current source 1610 at the gate node 1630. The source of the pull-low switch 1624 is coupled to ground. The differential amplifier 1622 has a first input coupled to a reference signal 1626 (DAC), a second input coupled to a feedback signal 1628 (FB) and one output coupled to the gate of the pull-low switch 1624.

The reference signal may vary with time, for example the reference signal may be a ramp signal such as a ramp voltage. In operation, the ramp signal defines the linear increase in the output voltage Vbst. For instance the ramp signal may be generated by a digital-to-analog converter (DAC). The feedback signal may be a ratio of the boost voltage, for example 1/10 of the boost converter output signal Vbst. During the pre-charge phase the feedback signal may rise together with the DAC reference signal.

In operation, the output of the differential amplifier 1622 is proportional to the difference between the feedback signal 1628 (FB) and the reference signal 1626 (DAC) and regulates the opening of the pull-low switch 1624. This in turns controls the amount of current flowing to the gate of the second high side switch 704 and determines the opening of the switch 704. If the feedback signal becomes larger than the reference signal, the output of the amplifier turns positive and pulls up the gate of the pull-low switch 1624, causing more current to flow to ground. As a result, the gate node 1630 is pulled down and less current flows through the high side switch 704. Whenever the FB signal falls below the reference signal the output of the amplifier turns negative and pulls down the gate of the pull-low switch 1624, causing less current to flow to ground. As a result, the gate node 1630 is pulled up and more current flows through the high side switch 704. This simple implementation allows increasing the output voltage of the boost converter 700 with the slew rate of the reference signal 1626 (DAC). In other words the switch 704 acts as a linear current source to increase the output voltage of the boost converter (Vbst) linearly.

Figures 17A, 17B, 17C:
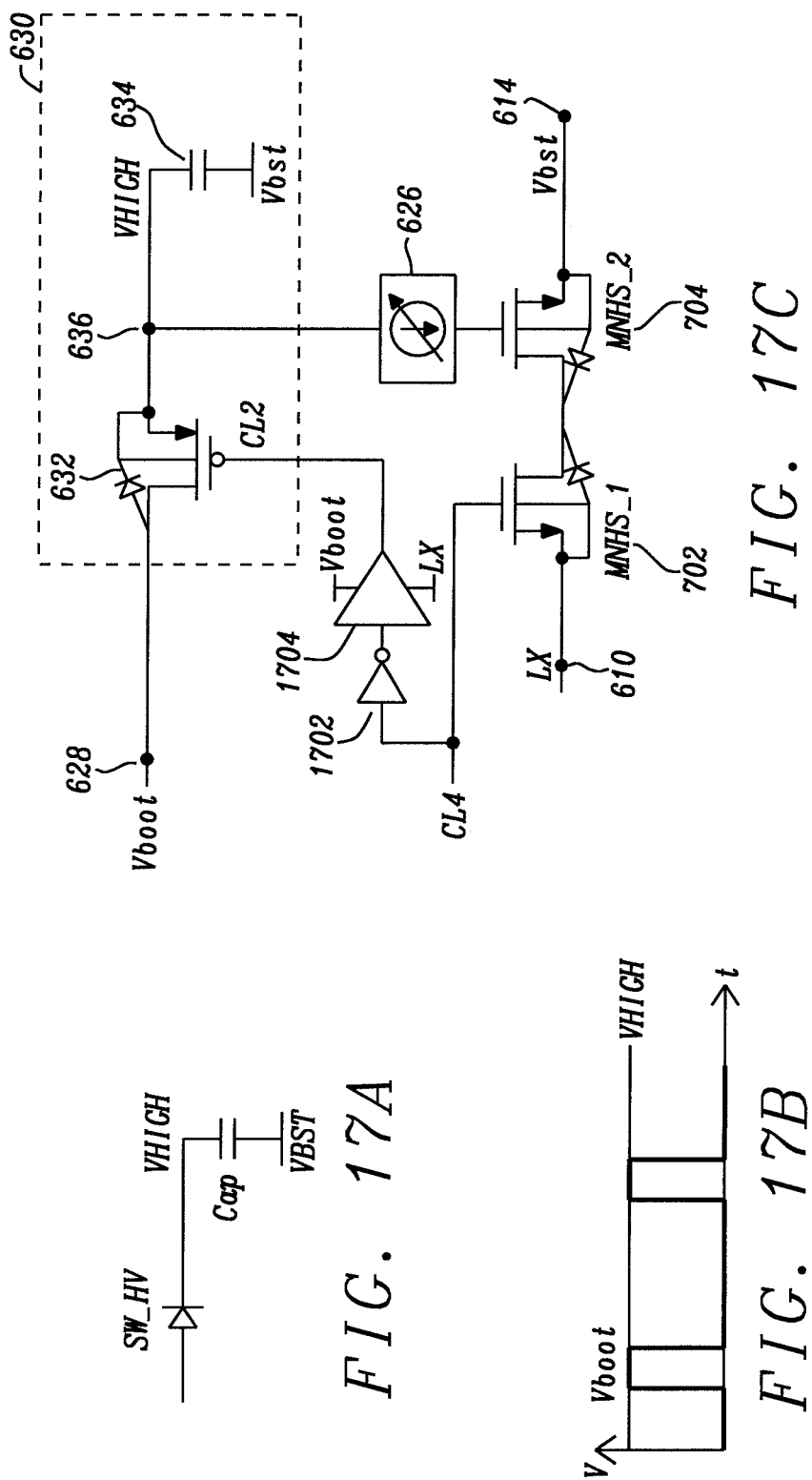
FIG. 17A is an equivalent model of a high voltage rectifier.
FIG. 17C is a diagram of a half-wave voltage rectifier and associated control.

FIG. 17A is an equivalent model of a high voltage rectifier. FIG. 17B illustrates the voltage Vboot received at the input of the rectifier and the rectified voltage VHIGH at the output of the rectifier. FIG. 17C shows an example implementation of the half-wave voltage rectifier 630. Depending on the boost voltage range, the rectifier switch 632 may be a low voltage or a high voltage switch. In this specific example the rectifier switch 632 is a P-type MOSFET switch. An inverter 1702 and a driver 1704 respectively invert and amplify the control signal CL4 to generate control signal CL2, which is used to drive the gate of the rectifier switch 632.

Figure 18:
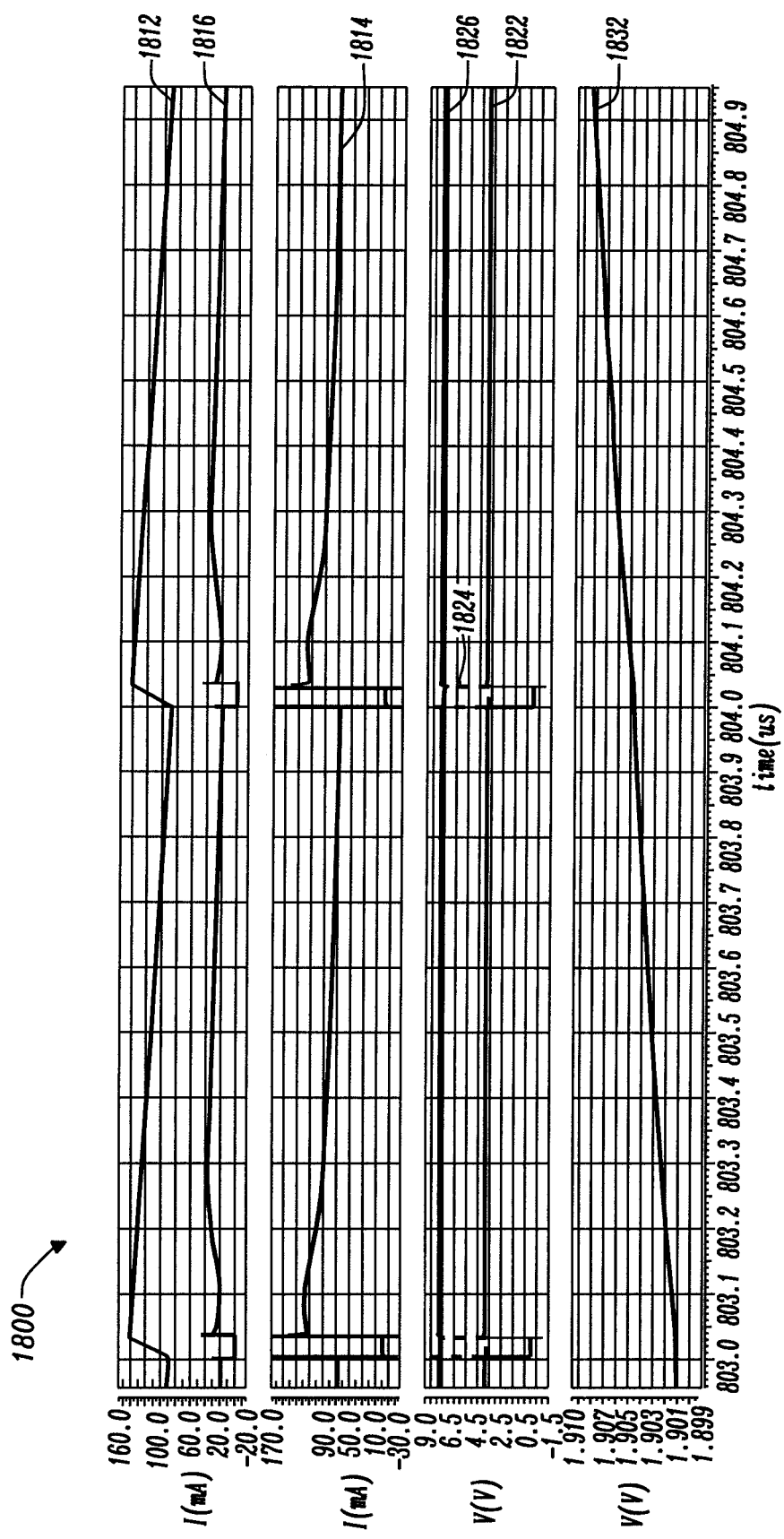
FIG. 18 is a simulation illustrating a first time interval of the pre-charge phase of the boost converter of FIG. 7 when implementing the method of FIG. 5.
Figure 19:
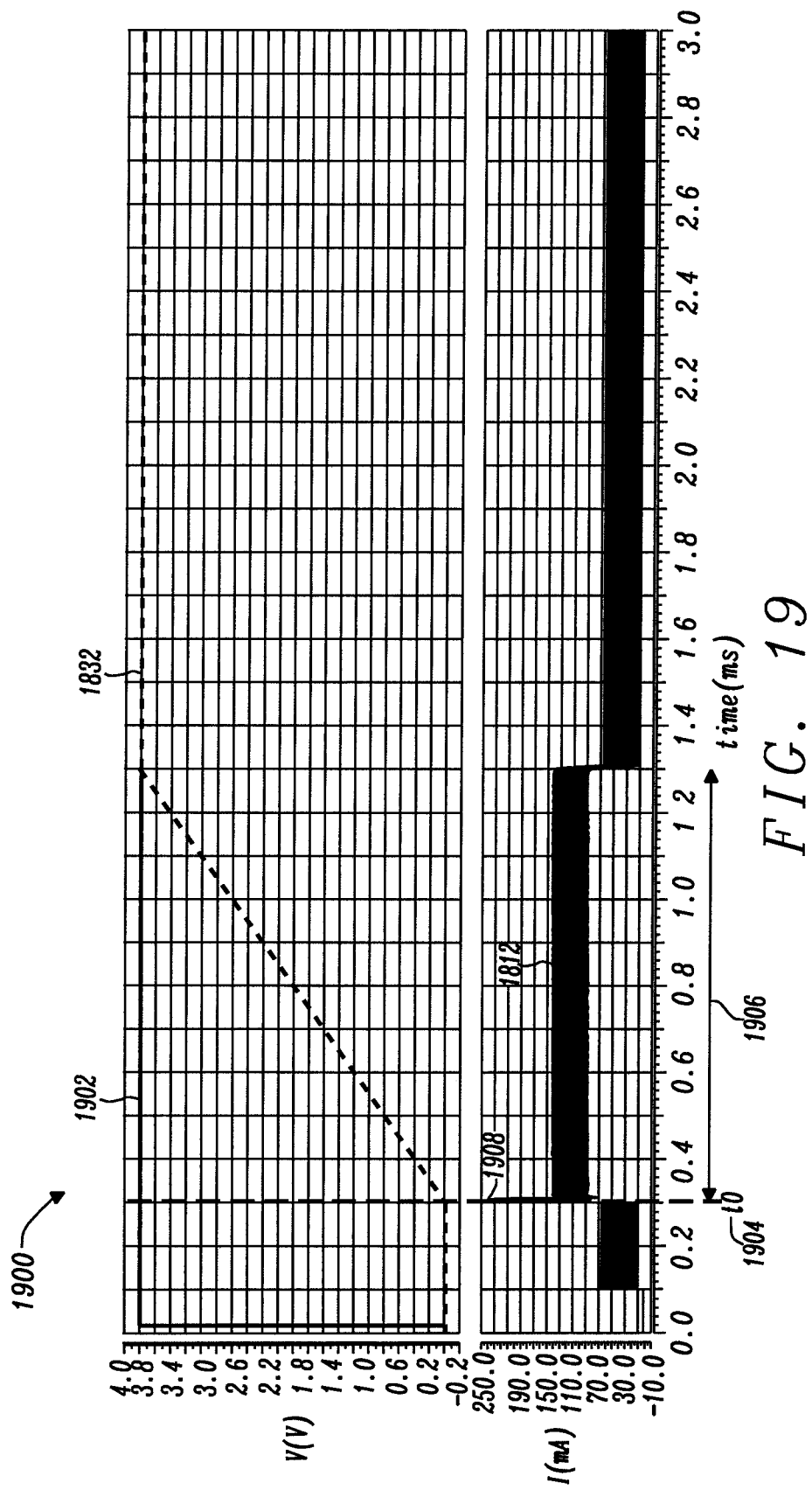
FIG. 19 is a simulation illustrating the pre-charge phase of the boost converter of FIG. 7 when implementing the method of FIG. 5.

FIG. 18 and FIG. 19 are simulations illustrating the pre-charge phase of the start-up method according to the present disclosure as implemented by the boost converter of FIG. 7. The graph 1800 shows the temporal evolution of various voltage and current signals of the boost converter 700 during an initial time interval of the pre-charge phase. The graph 1900 shows the temporal evolution during the whole pre-charge phase.

In this specific simulation the input voltage was set at 3.8V, the target output voltage at 3.8V, the inductance 602 at 2.2 µH, the DC resistance of the inductor 602 at 85 mΩ, the output capacitor at 22 µF, the DC resistance of the output capacitor 606 at 3 mΩ, the bootstrap capacitor 624 at 22 nF, the rectifier capacitor 634 at 20 pF and it was assumed that no load was attached to the output of the boost converter 700.

In FIG. 18, the lineplot 1812 is a simulation of the current through inductor 602 (ILX), the lineplot 1814 is a simulation of the current at the output of the boost converter (Ivbst), the lineplot 1816 is a simulation of the current through the anti-ringing switch 616 (Iatr), the lineplot 1822 is a simulation of the voltage at switch node 610 (VLX), the lineplot 1824 is a simulation of the voltage at the bootstrap node 628 (Vboot), the lineplot 1826 is a simulation of the voltage at the rectifier node 636 (VHIGH) and the lineplot 1832 is a simulation of the voltage at the output of the boost converter 614 (Vbst).

FIG. 19 illustrates the evolution of the output voltage (lineplot 1832) and the inductor current (lineplot 1812) during the complete pre-charge phase. Additionally, the lineplot 1902 represents the input voltage (Vin). The lineplot 1832 shows the linear increase of the output voltage during time interval 1906, which is achieved thanks to the analog modulator 626. During this interval the output voltage rises from 0 V to Vin with the slew rate of reference signal DAC 1626 of the voltage regulator loop 1620. When Vout reaches Vin, the pre-charge phase ends and the boost converter enters the boost phase (not simulated and not shown in FIG. 19). When the output voltage starts increasing at time t0 a small spike 1908 occurs in the inductor current 1812. This spike is lower than 250 mA and is due to the non-instantaneous response of the feedback line of modulator 626. When the output voltage reaches Vin and the boost converter transitions into the boost phase there are no current spikes. In this example, one cycle lasts 1 µs and the output voltage reaches Vin after 1000 cycles.

Figure 20:
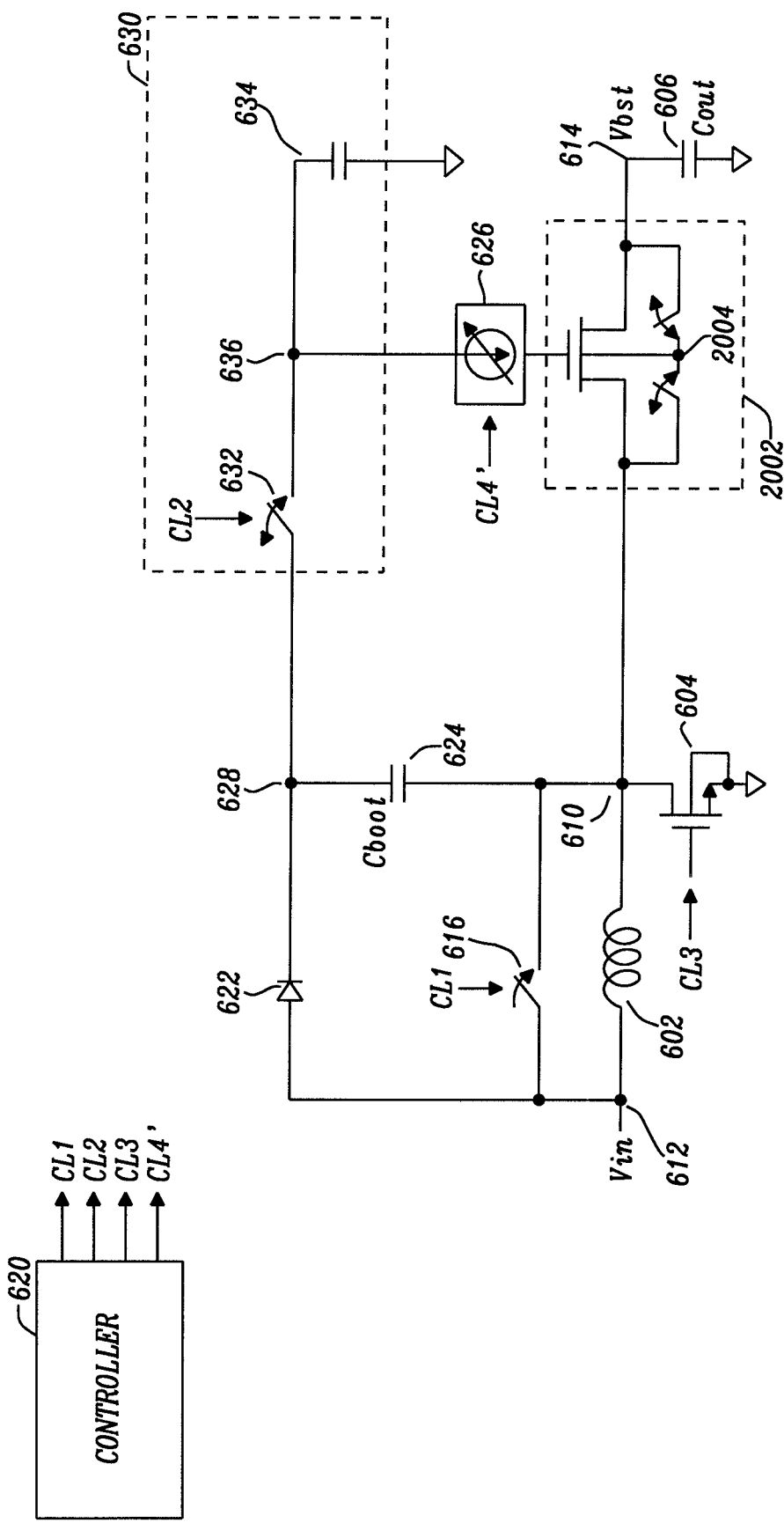
FIG. 20 is another embodiment of the boost converter of FIG. 6.

The boost converter of FIG. 6 can also be implemented with a single high side power switch. FIG. 20 is a diagram of a specific embodiment of the boost converter 600 in accordance with a second embodiment of the present disclosure. Common features between figures share common reference numerals. In the boost converter 2000 the high side power switch circuit includes a power switch such as a N-type MOSFET switch 2002 having a well switch structure. The well switch structure includes a first body diode between the body and the source and a second body diode between the body and the drain of the power switch. The positive to negative direction of the well switch can be either from the switching node LX 610 to the output node 614 or from the output node 614 to the switching node LX. The switch 2002 is configured such that its body 2004 is coupled to the output node 614 when Vbst<Vin and to the switch node 610 when Vbst>Vin. This "body switching" topology replaces the two back-to-back switches of the boost converter 700 and allows to achieve true shutdown of the boost converter 2000 by changing body direction.

The workings of the boost converter 2000 is similar to the workings of boost converter 700. Here the analog modulator 626 is controlled by a digital control signal CL4'. The boost converter 2000 is configured such that when the low side switch 604 is on, the control signal CL4' is in a logic zero, the analog modulator 626 is disabled and switch 2002 is fully turned off. When the low side switch 604 is turned off, the analog modulator 626 is activated via control signal CL4' and takes control of the opening of the switch 2002.

In conclusion the start-up pre-charge method and related boost converter presented in the present disclosure allow to implement a self-pumping procedure to increase the output voltage linearly from 0 to Vin without requiring a dedicated charge pump and switch, while at the same time eliminating the current spike at the beginning of the boost phase that affect some prior art designs.

What is claimed is:

1. A boost converter comprising a low-side power switch coupled to a high-side power switch at a switching node, an input terminal for receiving an input voltage and an output terminal for providing an output voltage; a voltage regulator coupled to the high-side power switch and a controller adapted to operate the boost converter in a start-up phase; wherein in the start-up phase the controller controls the boost converter
   to generate an intermediate voltage and increase the intermediate voltage to a predetermined value;
   to provide the intermediate voltage to the voltage regulator to obtain a drive voltage to drive the high side power switch; and
   to drive the high side power switch to increase the output voltage linearly up to a start-up voltage.

2. The boost converter as claimed in claim 1, wherein the predetermined value is greater than the input voltage.

3. The boost converter as claimed in claim 2, wherein the predetermined value is about twice the input voltage; and wherein the start-up voltage is about the input voltage.

4. The boost converter as claimed in claim 1, wherein the controller is adapted to operate the boost converter in a plurality of states forming a cycle, and to perform multiple cycles until the output voltage has reached the start-up voltage.

5. The boost converter as claimed in claim 1, comprising a bypass switch coupled in parallel with an inductor, wherein the controller is adapted to close the bypass switch to prevent a switching node voltage to increase beyond a threshold value.

6. The boost converter as claimed in claim 5, wherein the boost converter comprises a first capacitor coupled to the low side power switch via the switching node; the inductor; and a rectifier switch provided between the first capacitor and the voltage regulator wherein in a first state, the controller decouples the switching node from the output terminal, charges the first capacitor to obtain the intermediate voltage and closes the low-side power switch to magnetise the inductor.

7. The boost converter as claimed in claim 6, wherein in a second state, the controller maintains the switching node decoupled from the output terminal and opens the low-side power switch to increase the intermediate voltage to the predetermined value.

8. The boost converter as claimed in claim 7, wherein in a third state, the controller couples the switching node to the output terminal and closes the rectifier switch to provide the intermediate voltage to the voltage regulator.

9. The boost converter as claimed in claim 8, wherein in a fourth state, the controller maintains the switching node coupled to the output terminal and closes the bypass switch.

10. The boost converter as claimed in claim 6, wherein the rectifier switch is coupled to a second capacitor.

11. The boost converter as claimed in claim 10, wherein the second capacitor is coupled to the output terminal.

12. The boost converter as claimed in claim 5, wherein the bypass switch comprises a driver coupled to a pair of switches in a cascode configuration.

13. The boost converter as claimed in claim 1, wherein the voltage regulator comprises a low drop out regulator.

14. The boost converter as claimed in claim 1, comprising another high-side power switch coupled to the high-side power switch.

15. The boost converter as claimed in claim 14, wherein a drain terminal of the high-side power switch is connected to a drain terminal of the said another high-side power switch.

16. The boost converter as claimed in claim 1, wherein the high-side power switch and the low-side power switch are N-types power switches.

17. A start-up method for use with a boost converter comprising a low-side power switch coupled to a high-side power switch at a switching node, an input terminal for receiving an input voltage and an output terminal for providing an output voltage; a voltage regulator coupled to the high-side power switch; the method comprising
   generating an intermediate voltage and increasing the intermediate voltage to a predetermined value;
   providing the intermediate voltage to the voltage regulator to obtain a drive voltage to drive the high side power switch; and driving the high-side power switch to increase the output voltage linearly up to a start-up voltage.

18. The method as claimed in claim 17, wherein the predetermined value is greater than the input voltage.

19. The method as claimed in claim 17, wherein the predetermined value is about twice the input voltage; and wherein the start-up voltage is about the input voltage.

20. The method as claimed in claim 17, comprising rectifying the intermediate voltage.

* * * * *